(12) United States Patent
Perelli et al.

(10) Patent No.: US 11,927,990 B2
(45) Date of Patent: Mar. 12, 2024

(54) COMPUTING DEVICE

(71) Applicant: LENOVO (SINGAPORE) PTE. LTD, Singapore (SG)

(72) Inventors: Thomas Perelli, Morrisville, NC (US); Ali Ent, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/877,963

(22) Filed: Jul. 31, 2022

(65) Prior Publication Data

US 2024/0036616 A1 Feb. 1, 2024

(51) Int. Cl.
G06F 1/16 (2006.01)

(52) U.S. Cl.
CPC ............ *G06F 1/1679* (2013.01); *G06F 1/162* (2013.01)

(58) Field of Classification Search
CPC .... G06F 1/1679; G06F 1/1656; G06F 1/1658; G06F 1/162; H05K 5/0221
See application file for complete search history.

(56) References Cited

U.S. PATENT DOCUMENTS

| | | | | |
|---|---|---|---|---|
| 6,359,777 B1* | 3/2002 | Newman | ................. | G06F 1/183 361/679.55 |
| 9,977,460 B2* | 5/2018 | Wagman | ............... | G06F 1/1683 |
| 10,908,652 B2* | 2/2021 | Määttä | .................. | G06F 1/1683 |
| 10,969,825 B2* | 4/2021 | Lo | ......................... | G06F 1/1632 |
| 11,016,538 B2* | 5/2021 | Lange | ................. | H04M 1/0254 |
| 11,615,045 B2* | 3/2023 | Lo | .......................... | G06F 1/1632 710/303 |
| 11,775,006 B2* | 10/2023 | Pinciuc | ................. | G06F 1/1607 361/142 |
| 11,783,978 B2* | 10/2023 | Tazbaz | .................. | H01F 7/0263 361/807 |
| 2004/0190239 A1* | 9/2004 | Weng | ..................... | G06F 1/1669 361/679.2 |
| 2007/0138806 A1* | 6/2007 | Ligtenberg | ............ | G06F 1/1613 292/251.5 |
| 2015/0249302 A1* | 9/2015 | Witter | ................... | F16B 5/0642 439/39 |
| 2015/0288801 A1* | 10/2015 | Fishman | ................. | G06F 1/203 455/557 |
| 2018/0373294 A1* | 12/2018 | Perelli | .................... | G06F 1/1688 |
| 2020/0089285 A1* | 3/2020 | Gilbert | .................. | G06F 1/1632 |
| 2020/0245483 A1* | 7/2020 | Alva | ...................... | G06F 1/1615 |
| 2020/0363840 A1* | 11/2020 | Hurst | .................... | G06F 1/1654 |

(Continued)

*Primary Examiner* — Rockshana D Chowdhury
(74) *Attorney, Agent, or Firm* — Brian J. Pangrle

(57) ABSTRACT

A computing device can include a housing that includes a shell and a shell cover, where the shell cover includes a keyboard; and an electronic component secured in a component bay of the shell by a latch accessible upon displacement of the shell cover, where the component bay includes an electrical bay contact and bay magnets, where the electronic component includes an electrical component contact and component magnets, and where the component magnets are coupled to the latch and move responsive to actuation of the latch to lock the electronic component in the component bay via a magnetic attraction force between the bay magnets and the component magnets that mates the electrical bay contact and the electrical component contact and to unlock the electronic component for removal from the component bay.

20 Claims, 23 Drawing Sheets

(56) References Cited

U.S. PATENT DOCUMENTS

2020/0379522 A1* 12/2020 Andre ................... G06F 1/183
2021/0334417 A1* 10/2021 Morrison .............. G06F 1/1656
2022/0187794 A1* 6/2022 North ................... G06F 1/1616

* cited by examiner

System 2100

Shell(s) 2110

Shell Holder(s) 2120

Hinge Assemblies 2130

Bumpers 2140

Display, Keyboard, Processing Assemblies 2150

Components 2160

Positioning Mechanisms 2170

FIG. 21

COMPUTING DEVICE

TECHNICAL FIELD

Subject matter disclosed herein generally relates to technology for computing systems or other systems.

BACKGROUND

A computing system can be a clamshell system that can fold and open and can include, for example, a base housing and a display housing.

SUMMARY

A computing device can include a housing that includes a shell and a shell cover, where the shell cover includes a keyboard; and an electronic component secured in a component bay of the shell by a latch accessible upon displacement of the shell cover, where the component bay includes an electrical bay contact and bay magnets, where the electronic component includes an electrical component contact and component magnets, and where the component magnets are coupled to the latch and move responsive to actuation of the latch to lock the electronic component in the component bay via a magnetic attraction force between the bay magnets and the component magnets that mates the electrical bay contact and the electrical component contact and to unlock the electronic component for removal from the component bay. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

FIG. 21 is a diagram of an example of a system;

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
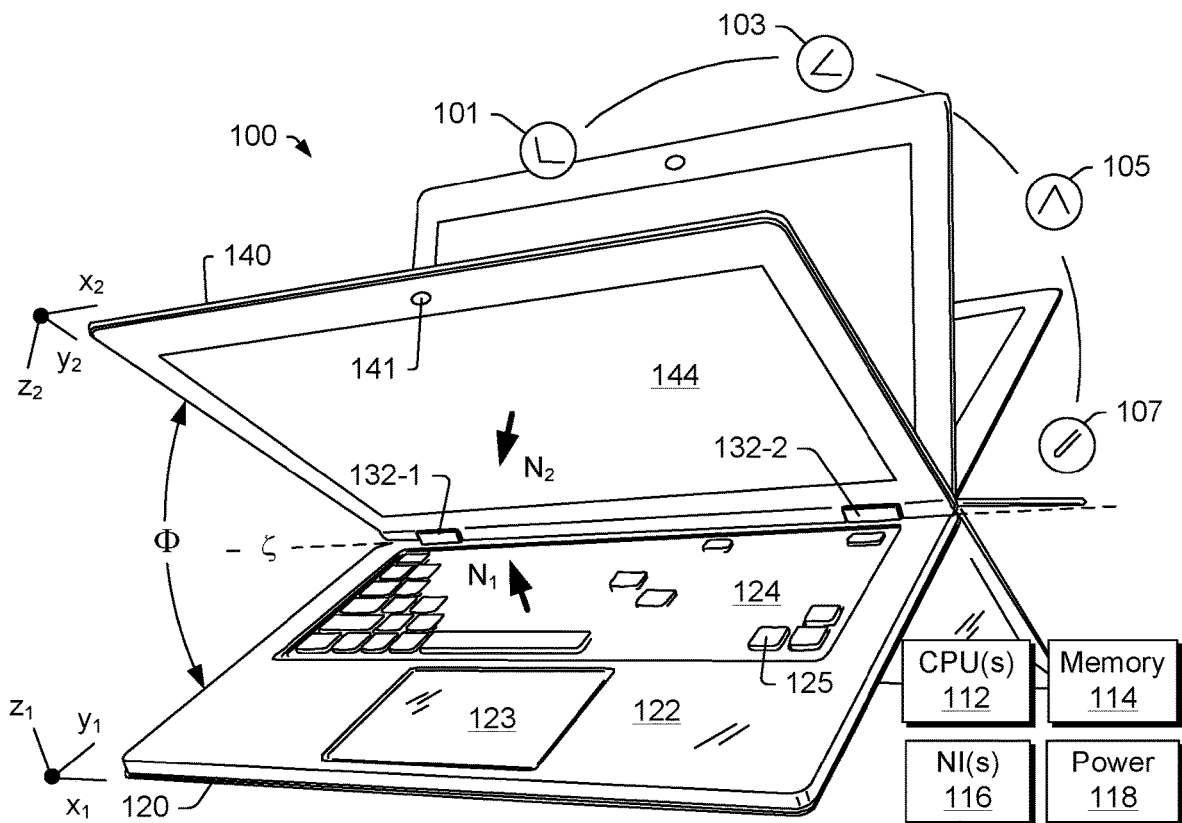
FIG. 1 is a diagram of an example of a computing device.
Figure 1:
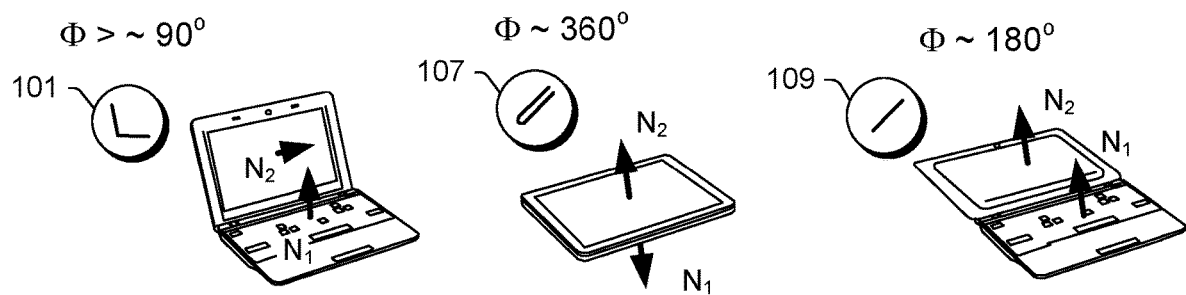

FIG. 1 shows an example of a computing device 100 (e.g., a computing system) that includes a keyboard housing 120 and a display housing 140 that are pivotable with respect to each other via movement about one or more hinges 132-1 and 132-2 (e.g., hinge assemblies). The computing device 100 may be a system such as, for example, a computing system (e.g., an information handling device, etc.).

As an example, the computing device 100 may include one or more processors 112, memory 114 (e.g., one or more memory devices), one or more network interfaces (NIs) 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144 and can include a camera 141 mounted in a bezel region of a bezel that surrounds the display 144. In such an example, the keyboard 124 is defined in a first Cartesian coordinate system as having a width along an x-axis ($x_1$), a depth along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a width along an x-axis ($x_2$), a depth along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and 109 may correspond to orientations of a clamshell computing system. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a system does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the computing device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other, whereas, in contrast, for a closed orientation of the computing device 100 (e.g., where the angle Φ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the computing device 100, the keys 125 may be contacted by the users hand or hands. A user may perceive the springiness of the keys 125 as being somewhat undesirable. For example, springy keys may interfere with a user's ability to comprehend or sense force that is sufficient to grasp the computing device 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis ζ) and then rotate the keyboard housing such that the keys face the back side of the display in a folded orientation. In such an example, a single centrally located hinge provides symmetry such that a computing system can be aligned in a clamshell closed orientation and a tablet orientation, optionally with the keys of the keyboard housing facing the back side of a display of a display housing.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing systems such as laptop or notebook computing devices can be characterized at least in part by a footprint. For example, the computing device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2:
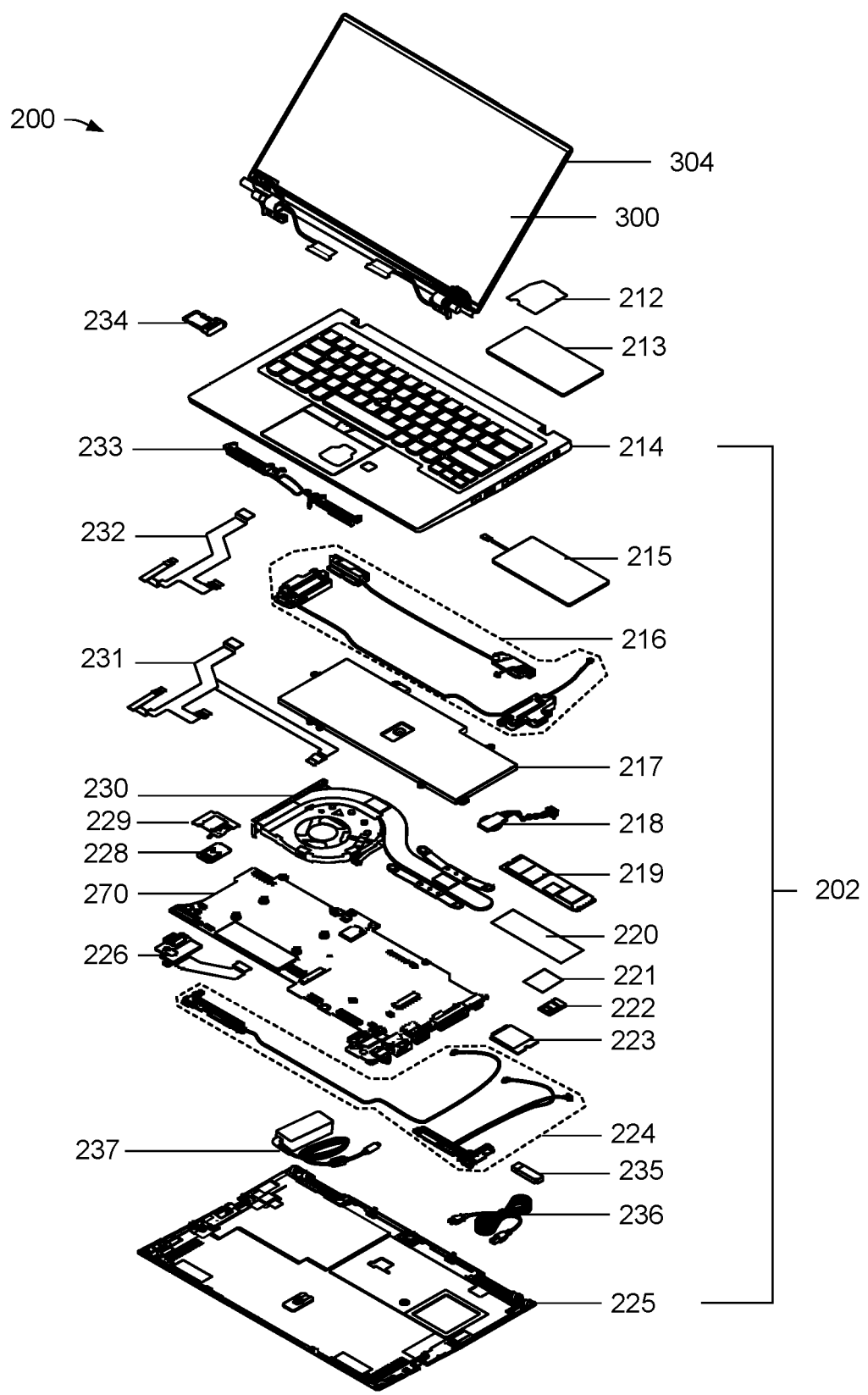
FIG. 2 is a diagram of an example of a computing device or computing system.

FIG. 2 shows an exploded perspective view of a computing device 200 as including various components, which can include, for example, a display assembly 300, a housing 304 (e.g., a display housing), insulation trackpad tape 212, a trackpad 213 or 215, a keyboard bezel assembly with a keyboard 214, a speaker kit 216, a built-in battery 217, a coin-cell battery 218, a solid-state drive 219, a thermal pad 220, NFC module foam 221, a NFC module 222, a wireless-WAN card 223, a wireless-WAN antenna assembly 224, a base cover assembly 225, a USB and power board 226, a system board 270, a fingerprint reader module 228, a fingerprint reader bracket 229, a thermal fan assembly 230, a trackpad and fingerprint reader cable 231 or 232, a wireless-LAN antenna assembly 233, a SIM-card tray 234, a recovery USB 235, a power cord 236, and an AC power adapter 237. The computing device 200 may be referred to as a computing system that can include various components, circuitry, etc.

In the example of FIG. 2, various components can form a housing 202, which may be referred to as a base housing and/or a keyboard housing, where the housing 202 may be coupled to the housing 304 via one or more hinge assemblies, etc. For example, the computing device 200 can include a first housing 202 coupled to a second housing 304 via one or more hinge assemblies (see, e.g., one or more hinge assemblies 326 of FIG. 3, etc.).

Figure 3:
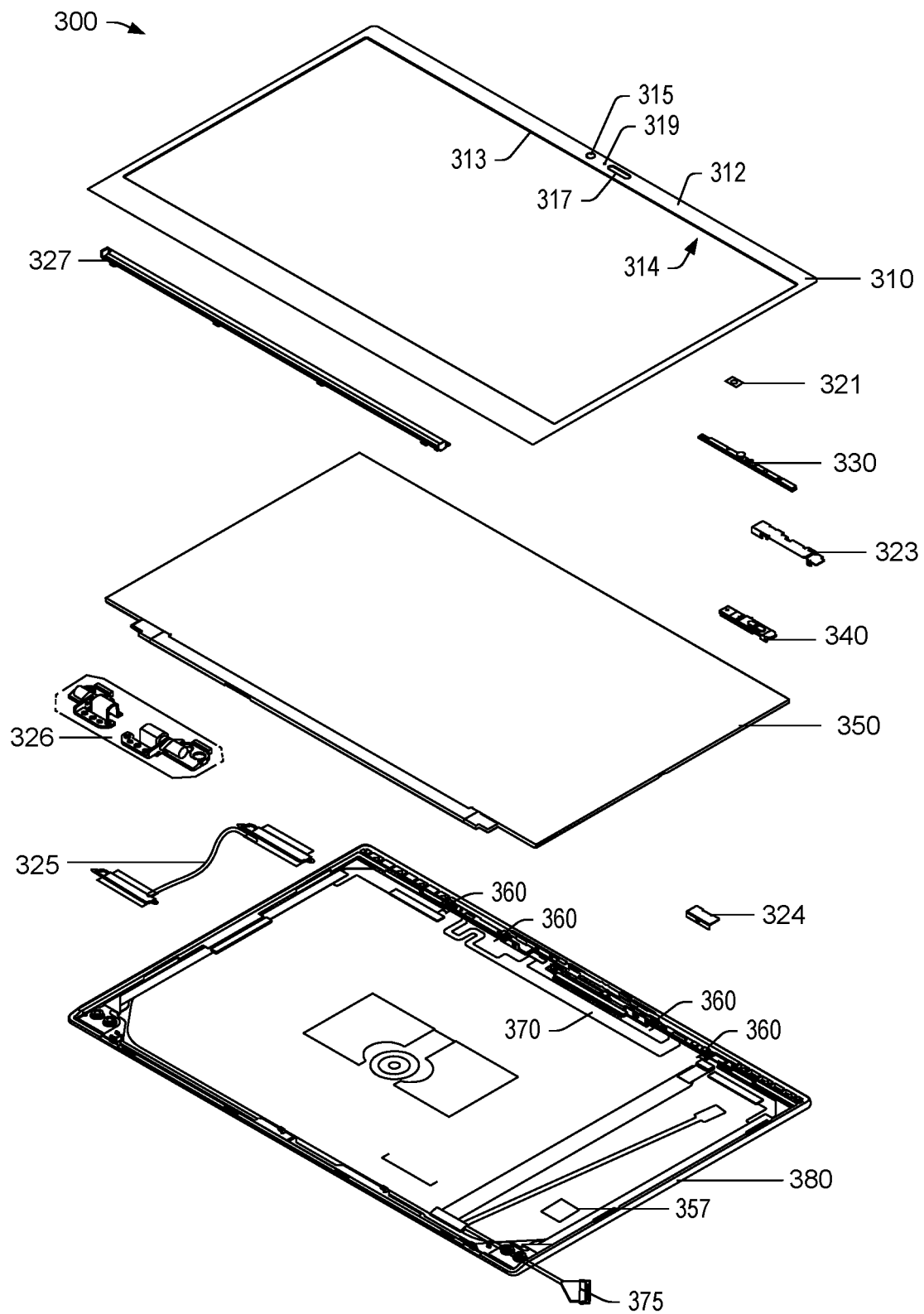
FIG. 3 is a diagram of an example of a display assembly of the computing device or computing system of FIG. 2.

FIG. 3 shows an exploded perspective view of the display assembly 300 of FIG. 2 as including various components, which can include, for example, a bezel 310, a foam component for an IR LED camera 321, a camera assembly 330, a stopper 323, a shutter 340, a display panel 350, an orientation sensor 357 (e.g., an accelerometer, gyroscope, etc.), a support plate 324, one or more microphones 360, wiring 370, one or more wiring connectors 375, a back side (rear) cover assembly 380, a display cable 325, one or more hinge assemblies 326, and a display bezel frame component 327. As shown, the display assembly 300 can be assembled to form the display housing 304, for example, by joining the bezel 310 (e.g., as a front side cover) and the back side cover assembly 380.

In the example of FIG. 2 and FIG. 3, the computing device 200 can include various media capture components. For example, a camera can be a media capture component, a microphone can be a media capture component, etc. A media capture component may be an audio media capture component, a video media capture component, a still image media capture component, etc.

As shown, the bezel 310 includes a front surface 312 and an opposing rear surface 314 where various openings extend between the front surface 312 and the rear surface 314. For example, as shown, the bezel 310 includes a display opening 313, a camera opening 315, a shutter control opening 317, and an IR camera opening (e.g., where an IR camera is included, noting that a camera may be a combined visible and IR camera).

As shown, the camera assembly 330 couples to the back side cover assembly 380 where the wiring 370 operatively couples to the camera assembly 330 and to the one or more microphones 360. The display assembly 300 can be operatively coupled to other circuitry of the computing device 200, for example, via the one or more wiring connectors 375.

As an example, a display housing can be referred to as being bezel-less where the size of a bezel or a frame is relatively small such that a display panel can extend to an edge or near an edge. For example, consider a smartphone that may have an edge of a housing or a frame that forms a thin bezel (e.g., less than 5 mm) about a display surface (e.g., a display glass, etc.).

As an example, inclusion of a bezel along one or more portions of a perimeter of a display housing, where such one or more portions have a thickness greater than a few millimeters, may help to provide protection for a display panel, which may include a display glass (e.g., cover glass).

Figure 4:
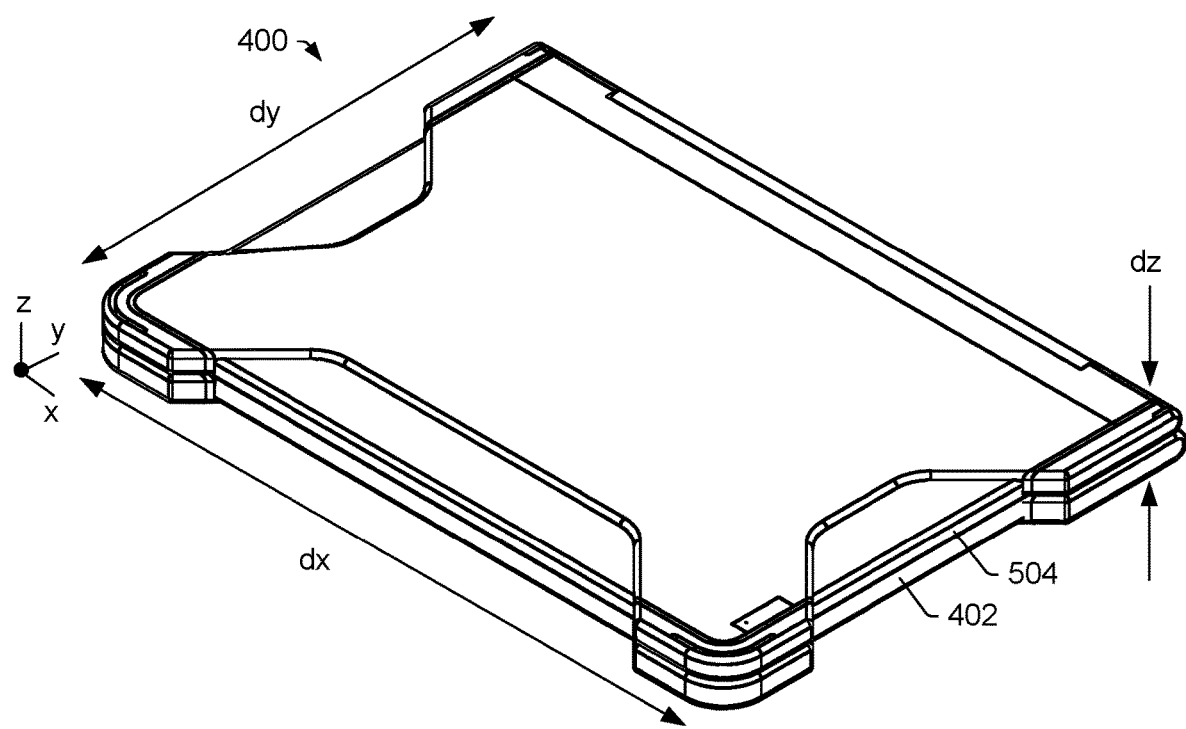
FIG. 4 is a diagram of an example of a computing device.

FIG. 4 shows an example of a computing device 400 that includes a first housing 402 and a second housing 504 in a clamshell arrangement where the housings 402 and 504 are in a closed position. The computing device 400 and the housings 402 and 504 can be defined using one or more coordinate systems such as a Cartesian coordinate system (x, y and z). For example, the computing device 400 can be defined by a width dx, a depth dy and a thickness dz where the thickness can be a sum of a thickness of a thickness of the housing 402 and a thickness of the housing 504, which may be the same or which may differ. For example, the housing 504 may be thinner than the housing 402.

Figure 5:
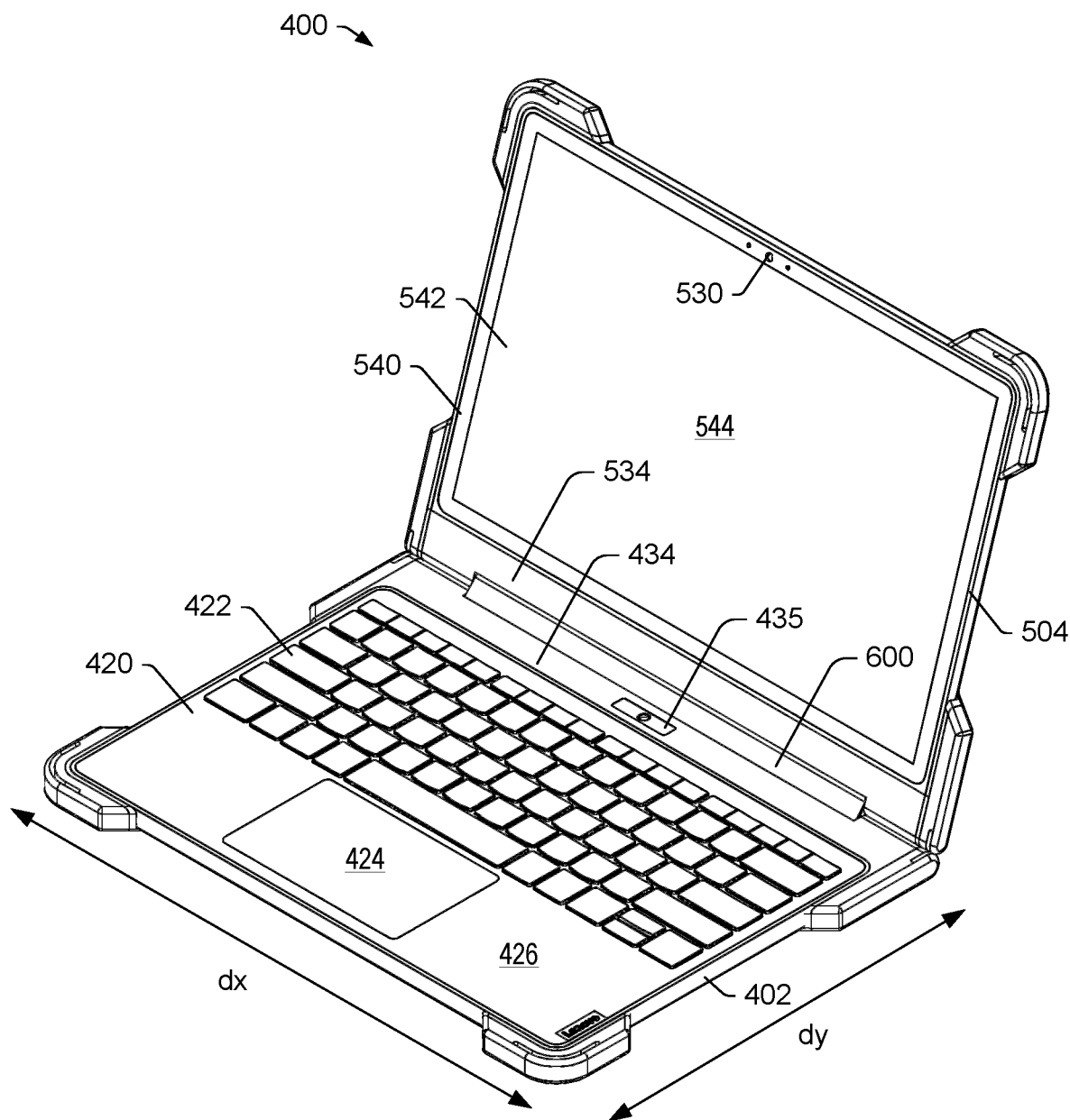
FIG. 5 is a diagram of an example of the computing device of FIG. 4.

FIG. 5 shows an example of the computing device 400 that includes the first housing 402 and the second housing 504 in a clamshell arrangement where the housings 402 and 504 are in an open position. As shown, the housing 402 can include a keyboard assembly 420 that includes a keyboard 422 and optionally a touchpad 424 and a palm rest 426 and the housing 504 can include a display assembly 540 that includes a display panel 542, which may be a touch-screen display, a digitizer display, etc., where the display panel 542 includes a display surface 544, which may be a surface of cover glass. In the example of FIG. 5, the display assembly 540 may include a bezel or it may be substantially bezel-less.

As shown in the example of FIG. 5, a hinge assembly 600 can couple the housings 402 and 504 where the hinge assembly 600 may include a right side hinge, a left side hinge and a hinge cover that may extend between the right and left side hinges. As explained, a computing device may include a single central hinge assembly that allows for rotation of one housing with respect to another along with opening and closing (e.g., consider a hinge assembly of the LENOVO THINKPAD TWIST computing device, etc.). As shown, the housing 402 can include a back end or hinge end component 434 and the housing 504 can include a back end or hinge end component 534. In the example of FIG. 5, the components 434 and 534 have cutout portions that accommodate the hinge assembly 600, for example, consider cutout portions that can accommodate portions of hinges and one or more hinge covers. As an example, a hinge can include one or more axles. For example, consider a dual-axle hinge that is a synchronized hinge such that both housing 402 and 504 move in unison. As explained, a hinge assembly may provide a 0 degree to 180 degree range of motion or, for example, a 0 degree to 360 degree range of motion (see, e.g., the orientations 109 and 107, respectively, in FIG. 1).

In the example of FIG. 5, the display assembly 540 includes a camera 530, which may be a camera module with one or more cameras. As an example, the display assembly 540 can include one or more microphones such as, for example, one or more of the microphones 360 as shown in FIG. 3. As an example, the camera 530 may be located with an opening or aperture in a bezel region of the display assembly 540, which may be part of a bezel material or a cover glass that extends over the opening or aperture.

In the example of FIG. 5, the housing 402 includes a switch 435, which can be a power switch that can be operatively coupled to circuitry for powering on the circuitry, powering off the circuitry, etc. In the example of FIG. 5, the switch 435 is shown as being disposed on the component 434 of the housing 402; noting that a switch may be appropriately positioned at another location of the housing 402 (e.g., a side edge, etc.).

Figure 6:
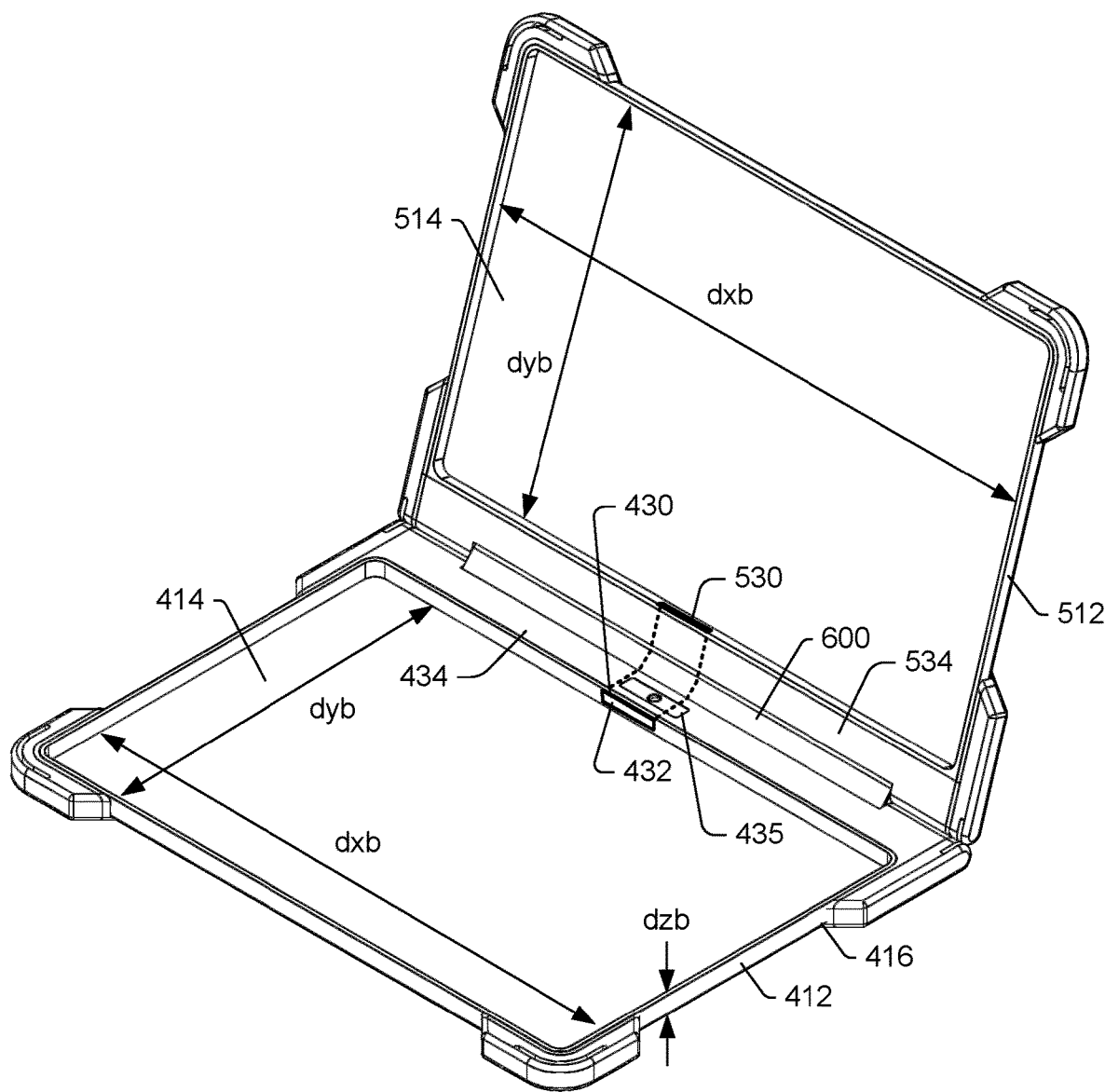
FIG. 6 is a diagram of an example of a portion of the computing device of FIG. 4.

FIG. 6 shows an example of a portion of the computing device 400 where the first housing 402 is formed in part by a first shell 412 that includes a first bay 414 and where the second housing 504 is formed in part by a second shell 512 that that includes a second bay 514. As shown in the example of FIG. 6, the shells 412 and 512 are coupled via the hinge assembly 600; the hinge assembly 600 couples the first shell 412 and the second shell 512 such that the first shell 412 and the second shell 512 can transition between a closed position and one or more open positions (see, e.g., FIG. 1, FIG. 4, FIG. 5, etc.). As an example, a display assembly can be positionable in the first bay 414 and positionable in the second bay 514. In such an example, the display assembly can include a display such as the display 540. As an example, two display assemblies may be utilized where one display assembly is positioned in the first bay 442 and another display assembly is positioned in the second bay 514.

In the example of FIG. 6, the first bay 414 is shown as having dimensions dxb and dyb along with a depth dzb while the second bay 514 is shown as having dimensions dxb and dyb where the second bay 514 may have a depth that is equal to that of the first bay 414 or, for example, a depth that is less than that of the first bay 414. As explained, a display housing of appropriate dimensions may be disposed in one of the first bay 414 and the second bay 514.

In the example of FIG. 6, the shell 412 includes a connector 430 and the shell 512 includes a connector 530. As shown, the connectors 430 and 530 can be electrically connected and may be disposed in respective bays 414 and

514; noting that the bay 414 may be formed wholly or in part by the shell 412, which may be removable from a shell holder 416 where the shell 412 can optionally include an opening for access to the connector 430 and/or a connector 432 that can be electrically coupled to the connector 430. In such an approach, a first assembly disposed in the first bay 414 may be electrically coupled with a second assembly disposed in the second bay 514. As shown, the switch 435 may be electrically coupled to circuitry that is electrically connected to the connectors 430 and 530. As an example, the switch 435 may be a multi-position switch or multi-function switch that can power on and/or off a first assembly, a second assembly or a first assembly and a second assembly. For example, the switch 435 may be a rocker switch that can be actuated on a left side, a center position or a right side where the left side may actuate an assembly in the bay 414, the center position may actuate an assembly in the bay 414 and an assembly in the bay 514, and the right side may actuate an assembly in the bay 514. In such an approach, a user may selectively determine which assembly or assemblies are to be turned on and/or off.

As an example, a user may wish to use a display assembly positioned in the bay 514 without powering on an assembly in the bay 414. In such an example, one or more switches may be provided that can power on the display assembly positioned in the bay 514 without powering on another assembly in the bay 414. Where the bay 414 includes a display assembly and the bay 514 includes a display assembly, one or more switches may be provided that can power on either one or both of the display assemblies.

Figure 7:
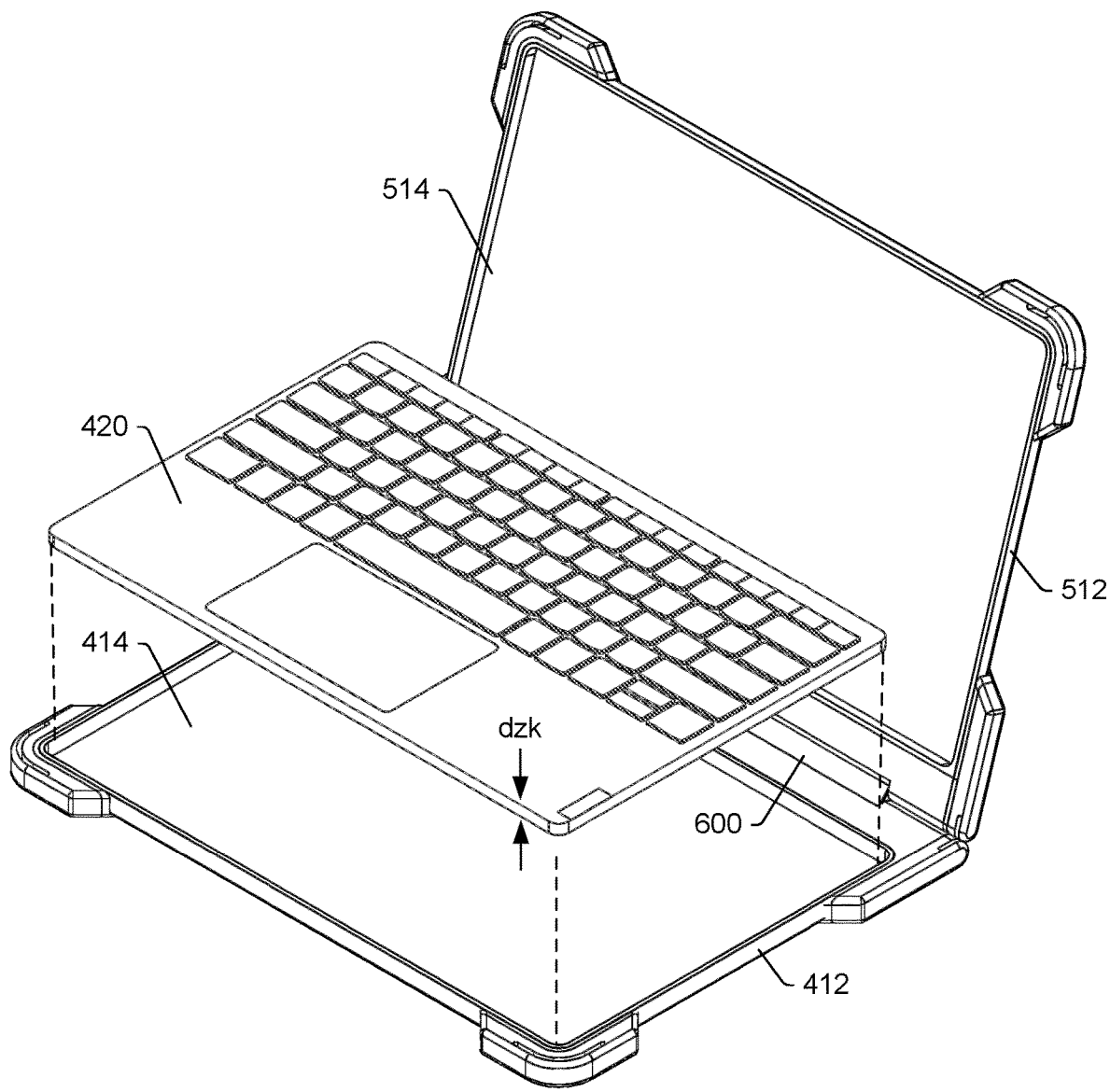
FIG. 7 is a diagram of an example of a portion of the computing device of FIG. 4.

FIG. 7 shows an example of a portion of the computing device 400 where the keyboard assembly 420 can be received in the bay 414 of the shell 412. In such an example, the keyboard assembly 420 may optionally include a processor and memory accessible to the processor (see, e.g., the one or more processors 112 and the memory 114 of FIG. 1, etc.). In the example of FIG. 7, the keyboard assembly 420 can include a connector that can electronically couple with the connector 430, which may be direct or indirect (e.g., via the connector 432).

In the example of FIG. 7, the keyboard assembly 420 is shown as having a thickness dzk. The thickness dzk may be a thickness of a keyboard with or without additional components such as, for example, a processor, memory, etc. In the example of FIG. 7, the keyboard assembly 420 can include components such as a processor and memory and, for example, a battery (e.g., a rechargeable lithium-ion battery, etc.).

As an example, rectangular dimensions of the keyboard assembly 420, front edge to back edge and side to side, can be approximately the same as rectangular dimensions of the display assembly 540, front edge to back edge and side to side. As explained, the bays 414 and 514 may have rectangular dimensions that are approximately the same such that either of the bays 414 and 514 can receive a display assembly or a keyboard assembly where the display assembly and the keyboard assembly are of substantially the same rectangular dimensions.

As an example, a system of assemblies, may be available where one or more of the assemblies may be selected for inclusion in a bay or bays of a device. In such an example, the assemblies can include circuitry with different capabilities, assemblies with different keyboards, assemblies with different display panels, assemblies with different batteries, assemblies with different physical and/or digital storage features. As an example, a system can include different stock keeping units (SKUs) where a device can accept one or more of the different SKUs to form a computing device. In such an example, a user may readily swap out an assembly, upgrade and/or downgrade a computing device, configure a computing device for a particular purpose, etc. For example, consider a computing device configured, using one or more SKUs, for a child, for travel, for work, for an outdoor environment, etc.

Figure 8:
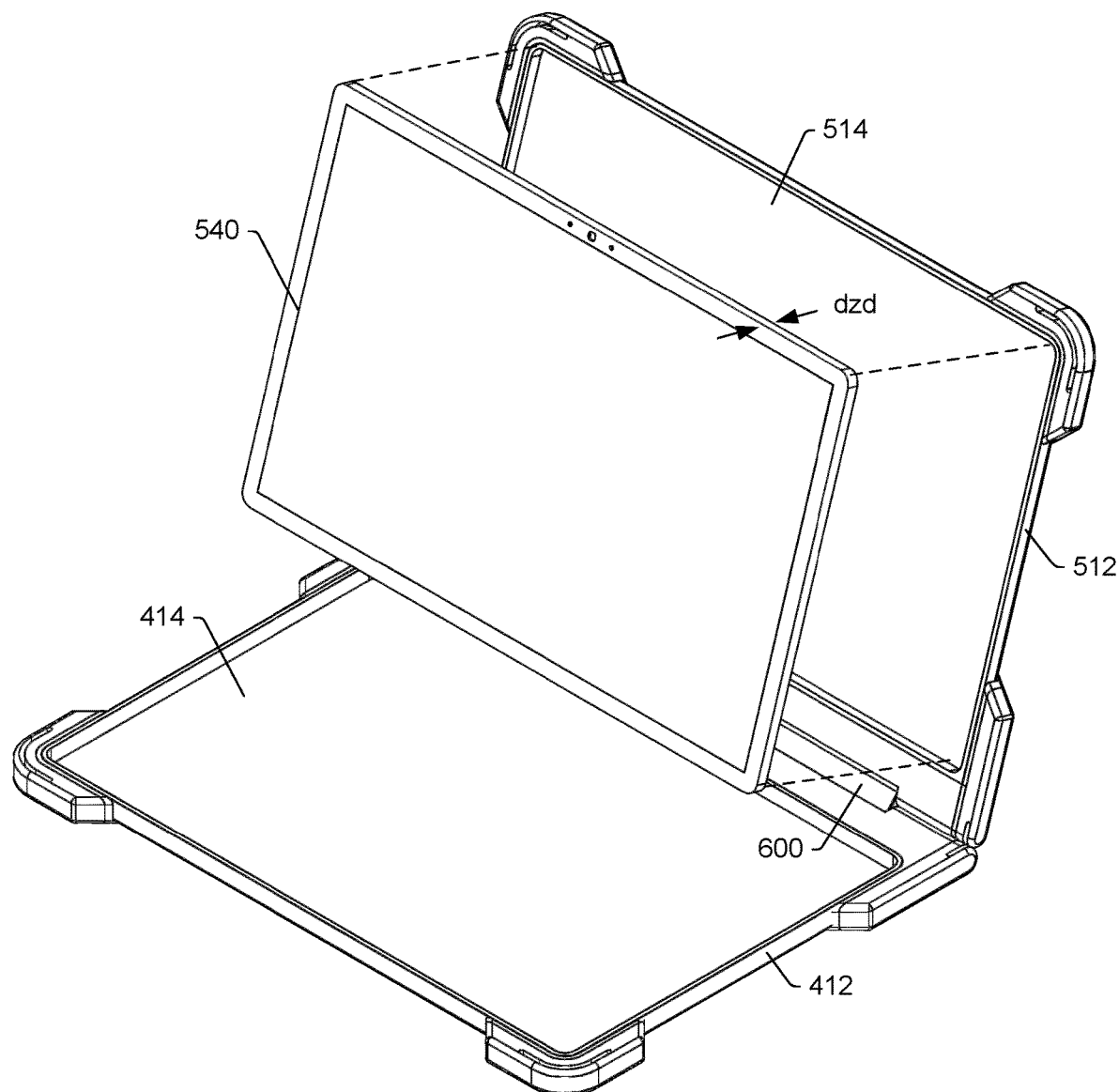
FIG. 8 is a diagram of an example of a portion of the computing device of FIG. 4.

FIG. 8 shows an example of a portion of the computing device 400 where the display assembly 540 can be received in the bay 514 of the shell 512. In such an example, the display assembly 540 may optionally include a processor and memory accessible to the processor (see, e.g., the one or more processors 112 and the memory 114 of FIG. 1, etc.). As an example, the display assembly 540 may be a stand-alone tablet computing device, which may be a lightweight Internet browsing device or a heavyweight computing device (e.g., with a multi-core processor and substantial memory). As mentioned, a system can include different assemblies and/or assembly components that can be SKUs where a user, a manufacturer, a service provider, etc., can select one or more assemblies and/or assembly components to customize a computing device.

In the example of FIG. 8, the display assembly 540 can include a connector that can electronically couple with the connector 530, as may be disposed within the bay 514. For example, consider an electrical contact connector such as a pogo-pin connector (e.g., spring-biased contacts). As an example, an assembly can include one or more magnets that can provide for registration of a connector such that a connector is properly aligned with another connector and, for example, such that an appropriate magnetic attraction force is provided to help to ensure a robust connection between connectors.

In the example of FIG. 8, the display assembly 540 is shown as having a thickness dzd. The thickness dzd may be a thickness of a display with or without additional components such as, for example, a processor, memory, etc. In the example of FIG. 8, the display assembly 540 can include components such as a processor and memory and, for example, a battery (e.g., a rechargeable lithium-ion battery, etc.).

Figure 9:
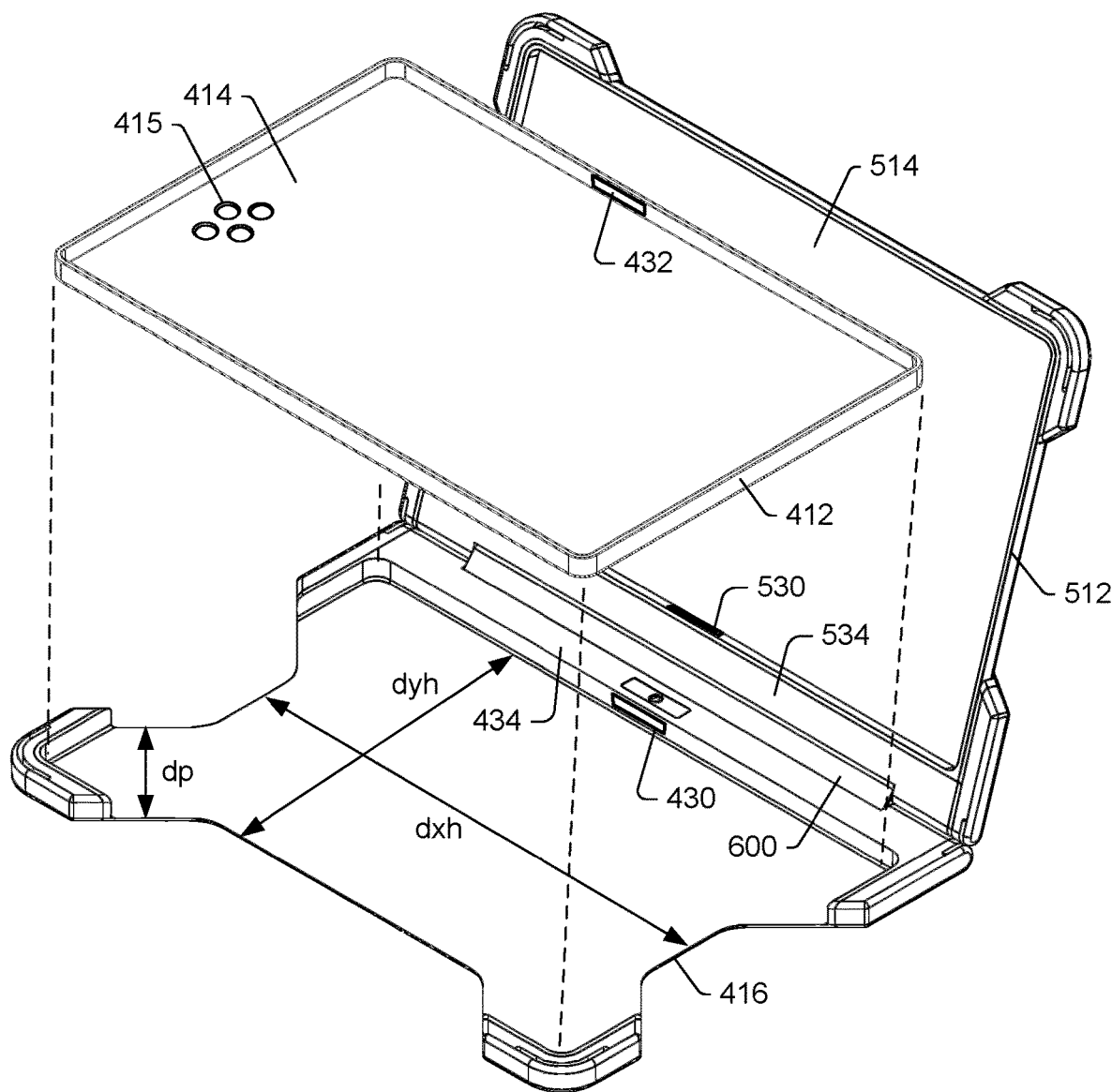
FIG. 9 is a diagram of an example of a portion of the computing device of FIG. 4.

FIG. 9 shows an example of a portion of the computing device 400 that can include the shell holder 416 where the shell 412 can be separable from the shell holder 416. In such an example, the shell 412 may be removable from the shell holder 416 where, for example, the display assembly 540 may be disposed in the bay 414. For example, the shell 412 can be separable from the shell holder 416 and, where the display assembly 540 is disposed in the bay 414, the shell 412 and the display assembly 540 may be utilized as a tablet computing device.

As an example, an appropriately sized tablet computing device may be received in the bay 414 of the shell 412 where the shell 412 is removable from the shell holder 416. In such an example, the shell 412 may provide protection as a case for the tablet computing device.

As an example, one or more users may utilize the bay 414 and/or the shell holder 416. For example, consider a display assembly or a keyboard assembly being set within a shell that can be received by the shell holder 416 where the shell 512 may include a display assembly in the bay 514. In such an example, one user may utilize the display assembly in the bay 514 with her assembly in the shell holder 416 and then remove her assembly such that another user may utilize the display assembly in the bay 514.

In the example of FIG. 9, the shell holder 416 is shown as including dimensions dxh and dyh, which are less than dimensions of the bay 414 dxb and dyb. As shown, portions of the shell holder 416 can extend outwardly in a planar manner at the front end of the shell holder 416. As shown, the shell holder 416 can include cutouts or recessed portions. As an example, the cutouts or recessed portions may align with one or more optionally openings 415 (e.g., grille openings, vents, etc.) in the shell 412, for example, to allow for airflow and heat transfer. As an example, one or more openings may align with an air mover such as a fan of an assembly.

Figure 10:
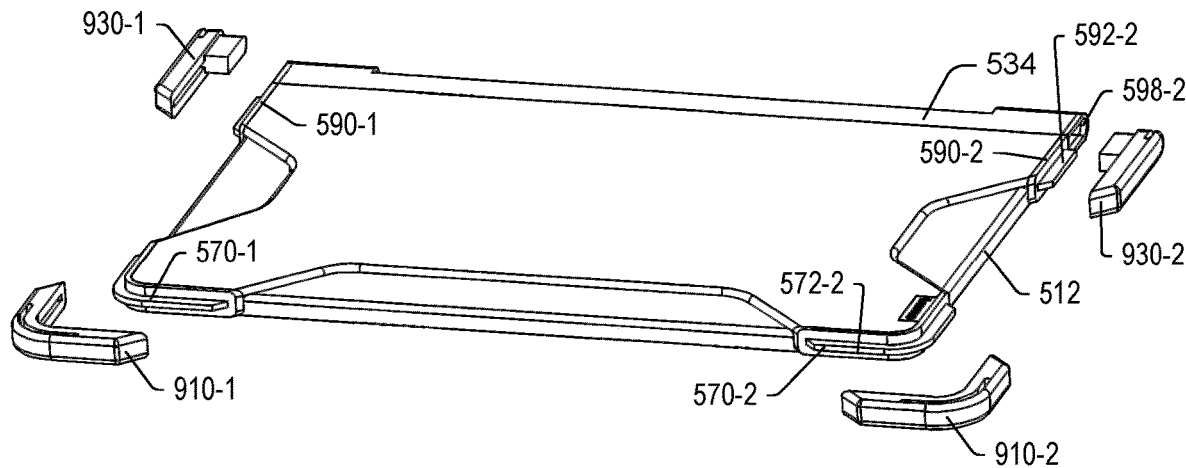
FIG. 10 is a series of diagrams of examples of portions of the computing device of FIG. 4.
Figure 10:
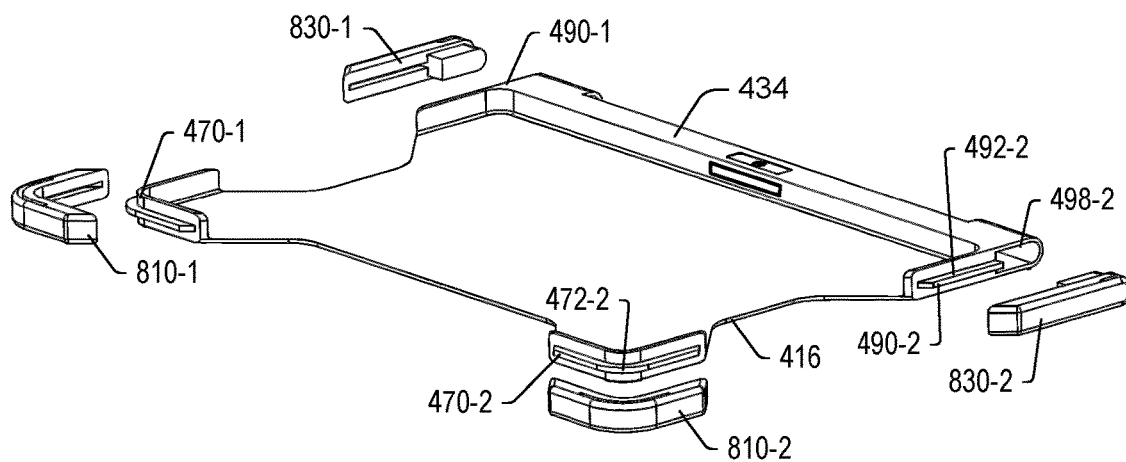

FIG. 10 shows an example of the shell holder 416 with front end corner bumpers 810-1 and 810-2 and back end corner bumpers 830-1 and 830-2 and the shell 512 with front end corner bumpers 910-1 and 910-2 and back end corner bumpers 930-1 and 930-2.

As an example, the shell 512 may be formed with recessed portions, which may, for example, match cutout or recessed portions of the shell 416. As an example, the shell 512 may be formed as a unitary piece (e.g., with or without bumpers) or as a number of separate pieces. As explained, the shell 412 may be separable from the shell holder 416 or, for example, the shell 412 and the shell holder 416 may be formed as a unitary piece (e.g., with or without bumpers). As an example, the shell holder 416 may be formed as a unitary piece (e.g., with or without bumpers) or as a number of separate pieces.

As shown, the shell holder 416 can include front end corner bumper supports 470-1 and 470-2 for the front end corner bumpers 810-1 and 810-2 and back end corner bumper supports 490-1 and 490-2 for the back end corner bumpers 830-1 and 830-2 and the shell 512 can include front end corner bumper supports 570-1 and 570-2 for the front corner bumpers 910-1 and 910-2 and back end corner bumper supports 590-1 and 590-2 for the back end corner bumpers 930-1 and 930-2.

As shown in FIG. 10, the shell holder 416 can include extensions such as the extensions 472-2 and 492-2 of the front end corner bumper support 470-2 and of the back end corner bumper support 490-2, respectively. As shown, the back end corner bumper support 490-2 can include a socket 498-2. For example, the back end corner bumper support 490-2 can include the extension 492-2 and the socket 498-2. As shown, the socket 498-2 may be defined by the component 434 and may be a recess that can also accommodate at least a portion of a hinge.

As shown in FIG. 10, the shell 512 can include extensions such as the extensions 572-2 and 592-2 of the front end corner bumper support 570-2 and of the back end corner bumper support 590-2, respectively. As shown, the back end corner bumper support 590-2 can include a socket 598-2. For example, the back end corner bumper support 590-2 can include the extension 592-2 and the socket 598-2. As shown, the socket 598-2 may be defined by the component 534 and may be a recess that can also accommodate at least a portion of a hinge.

Figure 11:
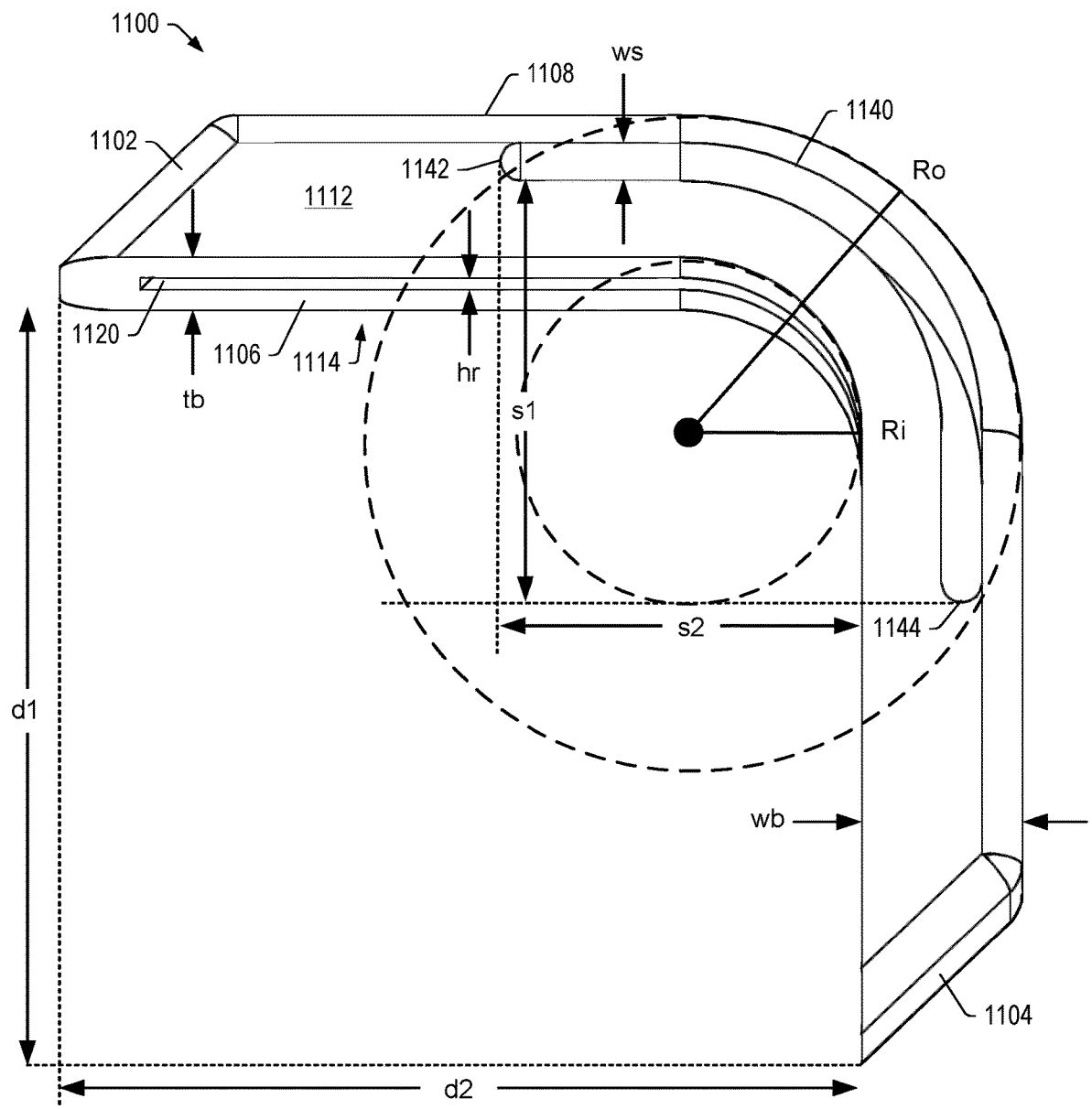
FIG. 11 is a perspective view of an example of a bumper.

FIG. 11 shows a perspective view of an example of a corner bumper 1100 that extends from a first end 1102 to a second end 1104 with a curved region therebetween (e.g., disposed between two straight regions or legs). As shown, the curved region can be defined by an inner dimension Ri and an outer dimension Ro, where one or both may be a radius (e.g., a radius of curvature). As shown, the corner bumper 1100 includes legs that can be defined by dimensions d1 and d2 where the legs may be equal in length or where the legs may differ in length. The corner bumper 1100 includes opposing surfaces 1106 and 1108 that extend between the ends 1102 and 1104. Further, the corner bumper 1100 includes opposing surfaces 1112 and 1114 that extend between the ends 1102 and 1104. As shown, the surface 1106 can be an inner surface while the surface 1108 can be an outer surface while the opposing surfaces 1112 and 1114 can be top and bottom surfaces.

As shown in the example of FIG. 11, the corner bumper 1100 can include a thickness tb defined between the surfaces 1112 and 1114 and a width wb defined between the surfaces 1106 and 1108. For mounting the corner bumper 1100 to a shell or a shell holder, the corner bumper 1100 can include one or more features such as, for example, a recess or recesses 1120. For example, the recess or recesses 1120 may cooperate with an extension or extensions that can be received in the recess or recesses 1120. As an example, an interference fit may be utilized to mount the corner bumper 1100 to a shell or a shell holder where a dimension of an extension exceeds a dimension hr of the recess or recesses 1120 such that an interference fit can be formed where material or an extension and/or material of the corner bumper 1100 can be resilient. While an interference fit is mentioned, one or more other types of mechanisms may be utilized. For example, consider gluing, welding, extruding, etc., to provide bumpers on a shell or a shell holder.

As shown in the example of FIG. 11, the corner bumper 1100 can include a slot or slots 1140 that can span a vertex of a corner. As shown, the slot or slots 1140 can include two closed ends 1142 and 1144 and a slot width ws that is less than the width wb of the corner bumper 1100. As an example, the slot or slots 1140 can include a through slot or through slots that can be defined by a height equal to the thickness tb. In the example of FIG. 11, the slot or slots 1140 can be defined by dimensions s1 and s2, where s1 is a fraction of d1 and where s2 is a fraction of d2.

As an example, the surface 1108 of the corner bumper 1100 can be curved in a manner where it can be defined by a semi-circle or semi-ellipse, etc. For example, in cross-section, the surface 1108 may be defined by a curve that meets the surface 1112 at one end and the surface 1114 at another end. In such an example, the curve may have a peak where the dimension wb may be defined at the peak.

As shown in the example of FIG. 11, the dimension Ro can be an outer radius that makes a corner of a computing device relatively curved rather than sharp. By increasing curvature at a corner, force from corner impacts may be more distributed compared to a sharp, 90 degree corner. Further, through use of bumpers that protrude outwardly from a housing, the amount of surface and material available for corner protection can be increased. In the example of FIG. 11, a corner of a shell or a shell housing may be slightly rounded, for example, as indicated by the inner dimension Ri; whereas, by providing the thickness wb, the outer dimension Ro is greater such that force from contact at the corner can be more distributed. Further, as mentioned, a slot or slots can be included such that some amount of deformation can occur for shock absorbing purposes. In various examples, material of construction and slot number, slot shape and/or slot size may be utilized to provide desired shock absorbing properties. As explained, various aspects of corner bumpers can be utilized for increased protection of a computing device from physical, mechanical shocks.

Figure 12:
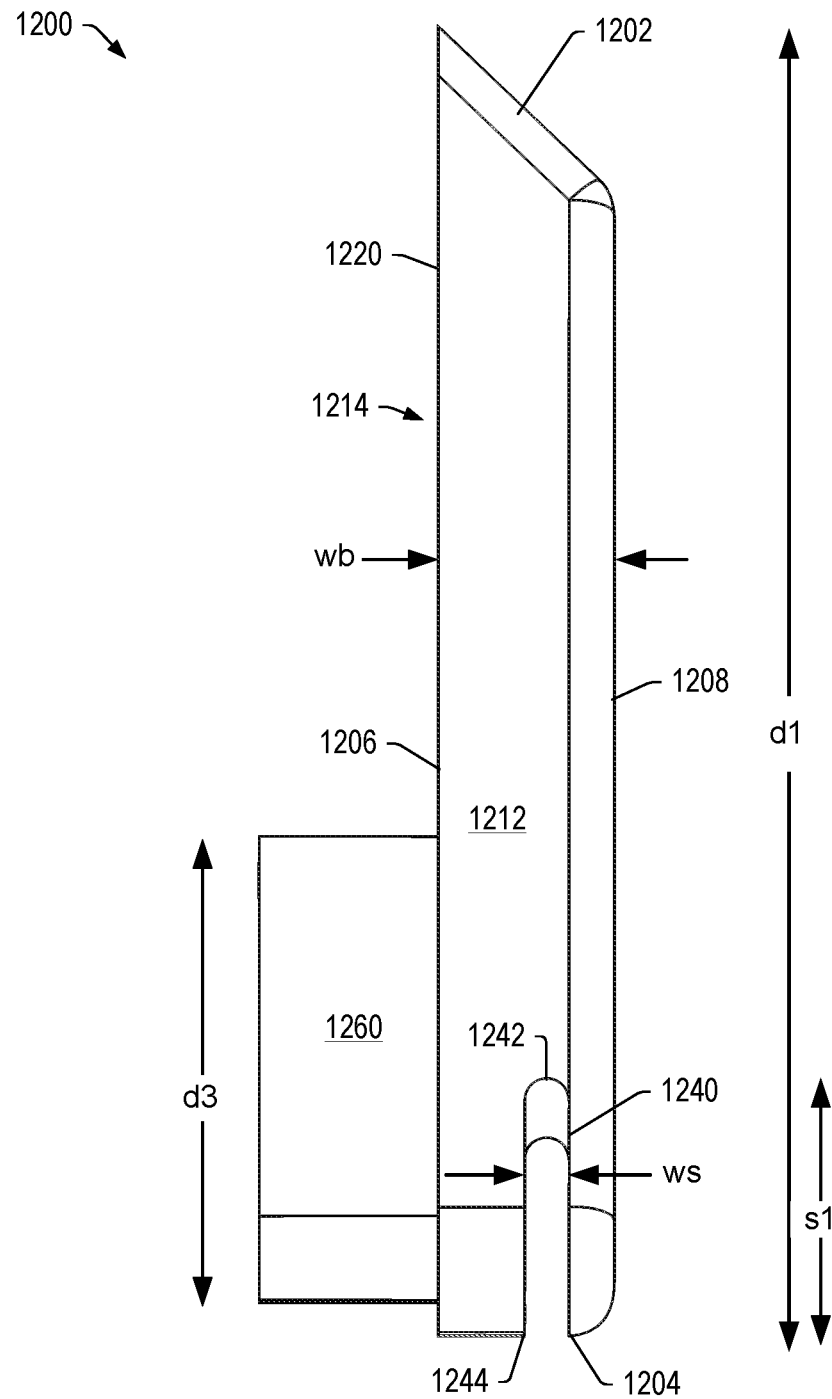
FIG. 12 is a perspective view of an example of a bumper.

FIG. 12 shows an example of a corner bumper 1200 that includes a first end 1202 and a second end 1204 along with opposing surfaces 1206 and 1208 and top and bottom surfaces 1212 and 1214 that extend between the first and second ends 1202 and 1204. In the example of FIG. 12, the surface 1206 can include a recess or recesses 1220, for example, akin to the recess or recesses 1120 of the bumper 1100 of FIG. 11. As shown in FIG. 12, the corner bumper 1200 can be defined in part by a length d1, a width wb where a slot 1240 can include a closed end 1242 that extends to an open end 1244 with a slot width ws and a slot length s1. As shown, a plug 1260 can be of a length d3 and an appropriate width and thickness for receipt in a socket of a shell or a shell holder. In such an approach, an interference fit may be utilized to secure the corner bumper 1200 to a shell or a shell holder. In the example of FIG. 12, a length of the slot 1240 overlaps at least in part with a length of the plug 1260. As an example, a length of the slot 1240 can extend past a length of the plug 1260 such that the slot 1240 reaches to or beyond a corner. In such an example, a corner of a shell or a shell holder may be protected at least on one side. As explained with respect to the corner bumper 1100 of FIG. 11, a corner bumper can include a recess that can receive an extension of a shell or shell holder. As an example, the surface 1208 of the corner bumper 1200 can be curved in a manner where it can be defined by a semi-circle or semi-ellipse, etc. For example, in cross-section, the surface 1208 may be defined by a curve that meets the surface 1212 at one end and the surface 1214 at another end. In such an example, the curve may have a peak where the dimension wb may be defined at the peak.

As shown in the examples of FIG. 11 and FIG. 12, a corner bumper may include a female feature and/or a male feature for securing the corner bumper to a shell or a shell holder. As explained, a corner bumper may include one or more slots where a slot may include closed ends or a closed end and an open end.

Figure 13:
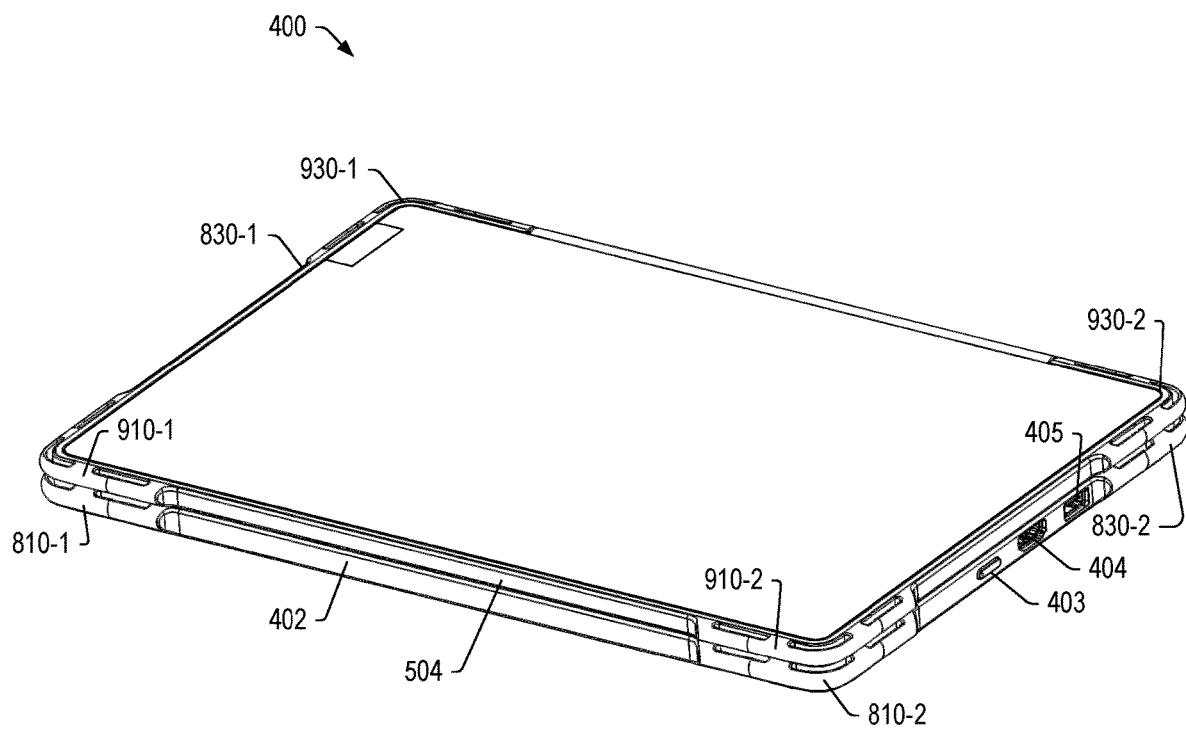
FIG. 13 is a diagram of an example of a computing device.

FIG. 13 shows an example of the computing device 400 where the housing 402 includes various components 403, 404 and 405, which may be provided with openings in a band that includes one or more corner bumpers. As shown, the housing 402 includes corner bumpers 810-1, 810-2, 830-1 and 830-2 and the housing 504 includes corner bumpers 910-1, 910-2, 930-1 and 930-2. In such an example, the corner bumpers can be similarly shaped and sized, noting that the corner bumpers of the housing 504 may be the same or different in thickness than the corner bumpers of the housing 402 (e.g., consider the housing 504 as a thinner display housing and the hosing 402 as a thicker keyboard housing).

Figure 14:
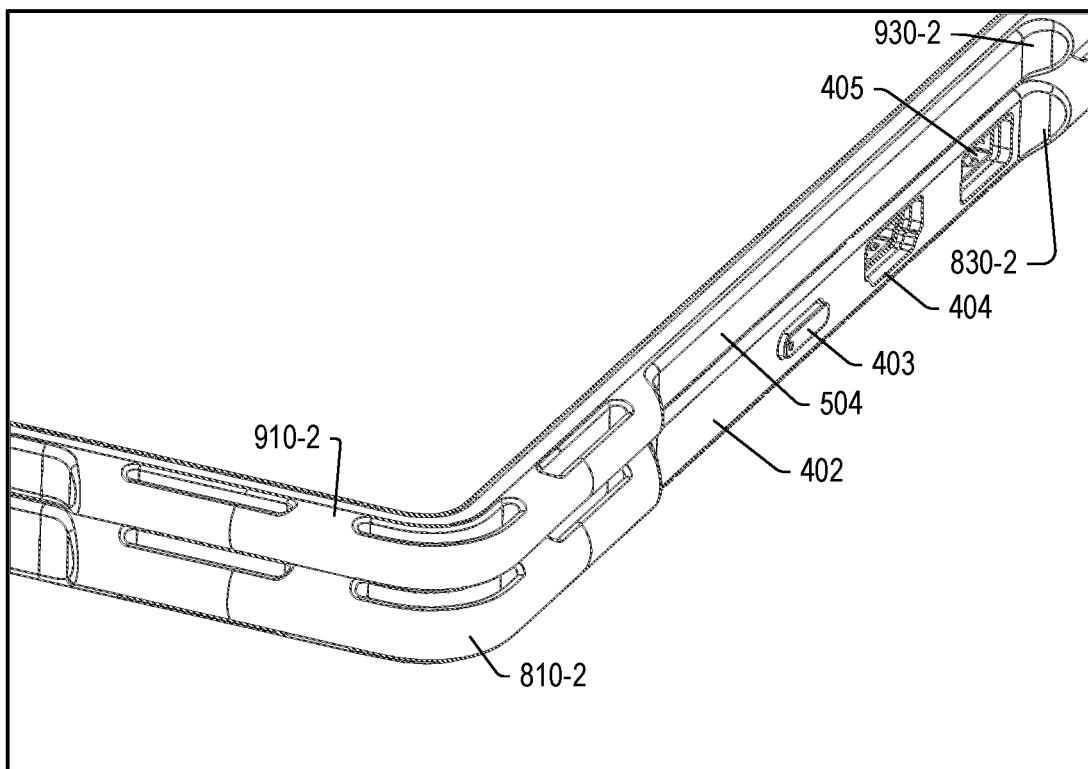
FIG. 14 is a diagram of an example of the computing device of FIG. 13.

FIG. 14 shows a portion of the computing device 400 of FIG. 13 where the corner bumpers 910-2 and 930-2 can be part of a band that extends along a side edge of the housing 504 and/or where the corner bumpers 810-2 and 830-2 can be part of a band that extends along the side edge of the housing 402 where openings provide access to the various components 403, 404 and 405. As shown, the component 403 may be a button (e.g., a switch) and the components 404 and 405 can be connectors (e.g., ports) such as, for example, power and/or data connectors. As shown in the example of FIG. 14, the components 403, 404 and 405 can be in a recessed region, which may help to protect them from contact. As shown, the components 403, 404 and 405 are along an edge of the housing 402 that includes portions of the corner bumpers 810-2 and 830-2 that extend outwardly where each includes a small sloping region between an outer bumper surface and the recessed region where the components 403, 404 and 405 are positioned. In such an example, if a connector (e.g., a plug) is received by one of the components 404 and 405, the connector can be protected to some extent as well by being at least in part within the recessed region (e.g., a lesser length of a connector that extends beyond an outermost dimension of the housing 402).

As shown in the example of FIG. 14, the corner bumpers 910-2 and 810-2 can include discrete slots, which may be or include at least one through slot. As shown, the slots can include a corner slot that spans a vertex of a corner of the housing 504 or a vertex of a corner of the housing 402. As shown, corner bumpers and slots may align when the housings 402 and 504 are in a closed position. In such an approach, if a corner of the computing device 400 contacts an object (e.g., a desktop, a countertop, a tabletop, a floor, etc.), aligned corner bumpers can provide combined shock absorbing capabilities, particularly when both are contacted.

As an example, the housing 402 and the housing 504 may be of a common thickness or may differ in thicknesses. As an example, corner bumpers may be formed with appropriate thicknesses, which may be common or different, to accommodate or match housing thicknesses.

Figure 15:
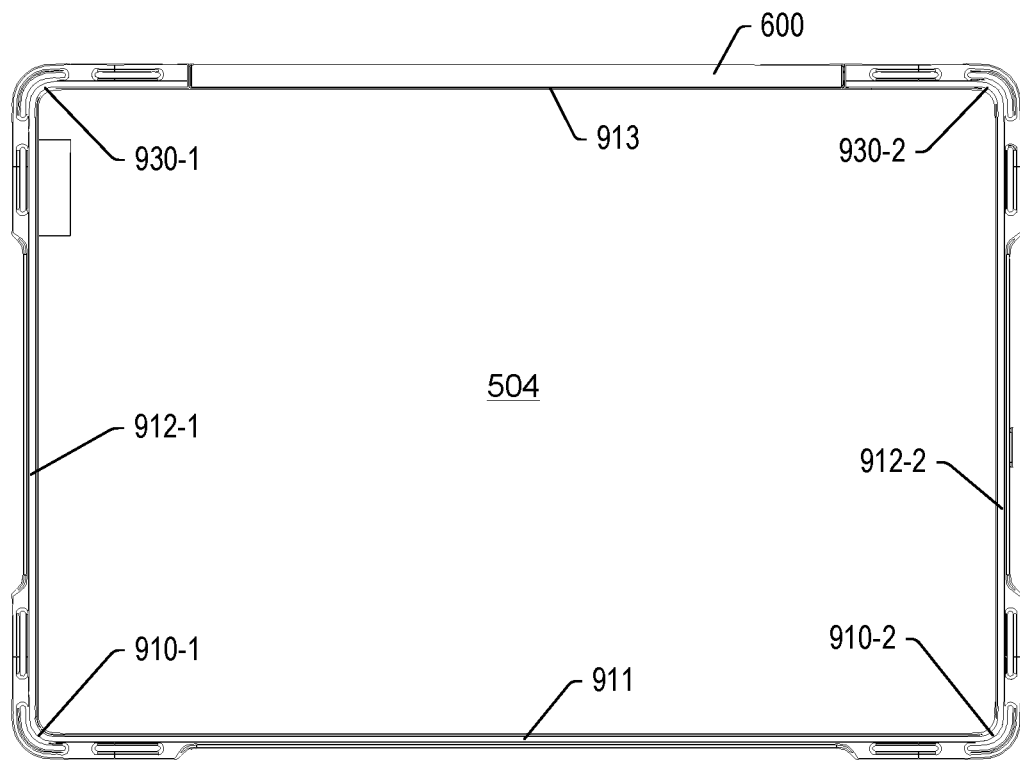
FIG. 15 is a series of diagrams of an example of the computing device of FIG. 13.
Figure 15:
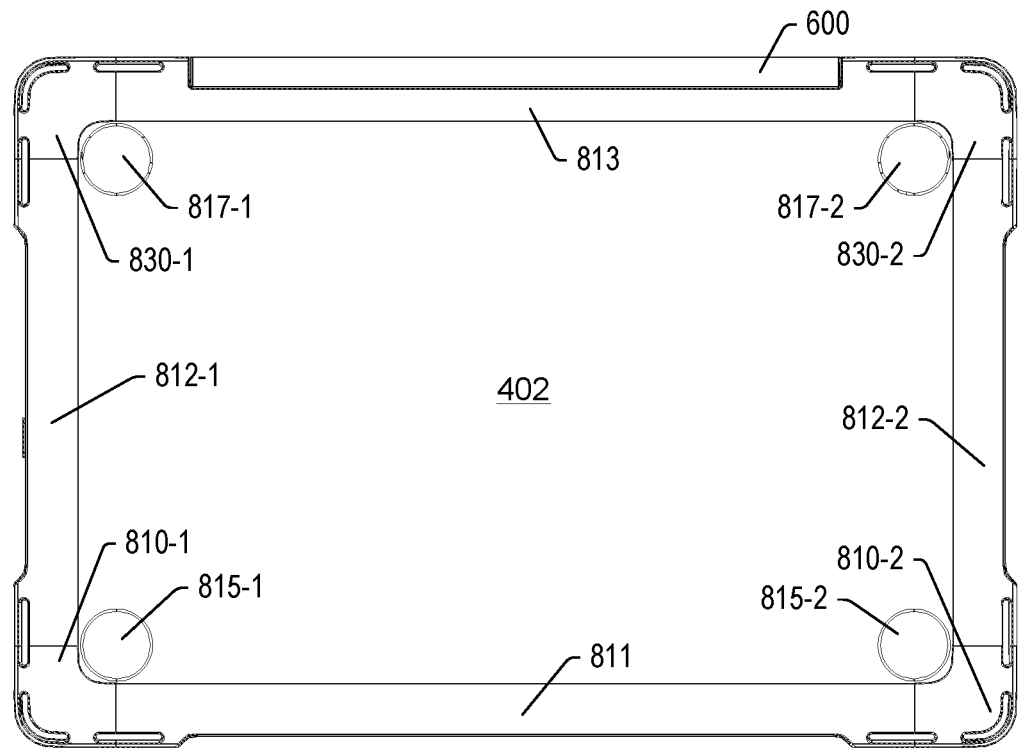

FIG. 15 shows a top view and a bottom view of the example of the computing device 400 of FIG. 13 where the corner bumpers 910-1, 910-2, 930-1 and 930-2 can be part of a continuous band with portions 911, 912-1, 912-2 and optionally 913 and/or where the corner bumpers 810-1, 810-2, 830-1 and 830-2 can be part of a continuous band with portions 811, 812-1, 812-2 and optionally 813. In such an example, a band can cover at least three full edges of the housing 504 and/or a band can cover at least three full edges of the housing 402. As shown in FIG. 15, a band or bands may include a shape or shapes along a hinge edge that provides a clearance for a portion of the hinge assembly 600. As an example, a band can be a 360 degree band that covers a perimeter of a housing.

In the example of FIG. 15, bumper material of the housing 504 may be formed with a relatively narrow width while bumper material of the housing 402 may be formed with a greater width. Such an approach can provide for increased protection of a bottom side of the housing 402, which may be more prone to contact objects. As shown, the housing 402 can include front end bottom feet 815-1 and 815-2 and back end bottom feet 817-1 and 817-2. Such feet may be separate from the bumper material and/or may be formed integrally with the bumper material. As an example, feet may be formed of a common material as bumpers. In such an approach, an overmolding process may form the bumpers and the feet of the housing 402 in a common production process. As an example, feet may extend outwardly from the housing 402 by a number of millimeters (e.g., consider a range from 1 mm to 8 mm). As an example, the feet 815-1 and 815-2 may be of a lesser height than the feet 817-1 and 817-2 such that the housing 402 can have a slight tilt when placed on a horizontal surface, which may provide for a more ergonomic position of a keyboard assembly, etc., of the housing 402.

As mentioned, a housing or housings may be formed with corner bumpers that extend outwardly such that a recessed region exists along one or more edges of a computing device. For example, in FIG. 15, recessed regions exist between front end corner bumpers 810-1 and 810-2 and 910-1 and 910-2 and between front end corner bumpers and back end corner bumpers 810-1 and 830-1, 810-2 and 830-2, 910-1 and 930-1 and 910-2 and 930-2 (see also, e.g., the example computing device 400 of FIG. 4). These three recessed regions can provide for more secure carrying of the computing device 400. For example, a user may place a hand between corner bumpers where a palm is in contact with an edge and where the corner bumpers help to prevent sliding of the computing device 400 in the user's hand. Referring again to the example of FIG. 4, recessed regions may also be provided on a top surface of the housing 504 and a bottom surface of the housing 402, which may also help to secure carrying of the computing device 400. As shown in FIG. 4, recessed regions of a top surface of a housing and/or a bottom surface of a housing can be aligned with recessed regions defined by bumpers.

As an example, a computing device may be configured for secure gripping by a hand that, in some instances, may be relatively small. For example, consider the hand of a child, which may more easily grip a computing device where the computing device includes one or more recessed regions. Further, such a child may be more prone to accidental drops of the computing device and/or accidently contacts of the computing device with an object, bumpers can provide additional shock absorbing protection. An approach that combines corner bumpers that form recesses with top and/or bottom recesses can improve user grip and can improve shock absorbing if a user's grip should fail.

Table 1, below, shows various examples of average hand dimensions for children, where hand length and hand breadth tends to increase from age 6 to age 11.

TABLE 1

Examples of average hand dimensions.

| Gender | Average hand length | Average hand breadth |
|---|---|---|
| Male | | |
| | 6-year-olds: 4.6-5.7 inches (11.7 cm to 14.5 cm) | 6-year-olds: 2.1-2.6 inches (5.3 cm to 6.6 cm) |
| | 11-year-olds: 5.5-6.8 inches (14 cm to 17.3 cm) | 11-year-olds: 2.0-3.1 inches (5.1 cm to 7.9 cm) |
| Female | | |
| | 6-year-olds: 4.4-5.7 inches (11.2 cm to 14.5 cm) | 6-year-olds: 2.0-2.7 inches (5.1 cm to 6.9 cm) |
| | 11-year-olds: 5.6-7.0 inches (14.2 cm to 17.8 cm) | 11-year-olds: 2.0-3.1 inches (5.1 cm to 7.9 cm) |

Referring again to the examples of the computing device 400 in FIG. 4 and FIG. 15, note that the recessed region along the front edge (e.g., opposite the hinge edge) is of a longer dimension than that of the recessed region along the side edges. In various instances, a user may position a hand centrally along a front edge recessed region to carry the computing device 400 in a balanced manner. For young children, they may utilize a left hand and a right hand to carry the computing device 400 where each hand is positioned along a respective recessed region one of the opposing side edges of the computing device 400. In such an example, the recessed regions may be at least approximately 3.1 inches (e.g., 7.9 cm) in length to accommodate hand breadth. As explained, the computing device 400 can be configured to be securely carried using one hand or two hands where, for example, a two handed carry may be more common for young children. And, as explained, corner bumpers can provide for shock absorbing capabilities if a user may drop or otherwise contact an object with the computing device 400, particularly at a corner (e.g., corner protection).

As an example, a material may be characterized by durometer hardness and/or Young's modulus, which are related as Young's modulus is measurable using applied stress (e.g., as to extension) and as durometer hardness is measurable using compression with an indenter. For various materials, curve fitting may be utilized to allow for estimation of Young's modulus from durometer readings to approximately first order accuracy. The Shore 00 Hardness Scale measures rubbers and gels that are very soft; the Shore A Hardness Scale measures the hardness of flexible mold rubbers that range in hardness from very soft and flexible, to medium and somewhat flexible, to hard with almost no flexibility at all (noting that semi-rigid plastics can also be measured on the high end of the Shore A Scale); and the Shore D Hardness Scale measures the hardness of hard rubbers, semi-rigid plastics and hard plastics.

As an example, a material for use in bumpers can be a polymeric material. For example, consider use of silicone. As an example, a silicone with a Shore A hardness less than approximately 90 may be utilized. While silicone is mentioned, one or more other materials may be utilized (e.g., flexible mold rubbers, semi-rigid plastics, etc.). A Shore A value of 90 is slightly less than a Shore D value of 50. For sake of comparison, an automotive tire tread may have a Shore A value of approximately 70. As an example, a material for a bumper may be a damped, viscoelastic, polymeric solid. As an example, a material for a bumper may be a thermoset such as, for example, a polyether based polyurethane, etc.

As an example, a slot can provide for deformation in a shock absorbing manner. For example, a bumper may be a solid bumper or a bumper with one or more internal gaps. In various instances, material of construction of a solid bumper may demand a hardness that is lower than that of a bumper with one or more internal gaps. As an example, one or more internal gaps can provide for thinning of at least a portion of a bumper such that a material of construction with a greater hardness may be utilized.

As an example, a closed ended slot in a corner bumper can compress for shock protection. For example, consider a drop test where landing on a corner can act to concentrate force per unit area such that deformation from a slot can help to absorb such force. As an example, a slot can be positioned adjacent to one or more other slots, which may help to dissipate force.

As an example, a shell and/or a shell holder may be formed of a material with a hardness that is greater than that of a bumper. For example, consider a material with a Shore D value greater than 50. As an example, a material may be an acrylonitrile butadiene styrene (ABS) material (e.g., an ABS plastic). An ABS material may have a Shore D value greater than approximately 70 (e.g., greater than a maximum value of 100 on the Shore A scale).

As an example, a housing may be formed using an over-molded processing technique where, for example, bumpers and a shell and/or a shell holder are molded together in a single cycle (e.g., using a family mold, a single cavity high pressure press, etc.).

An overmolding process can created a component using two or more materials combined where in various instances a first material serves as a substrate that will be covered in part or whole by another material during an overmolding process. For example, consider a rigid plastic component to be covered in part with a thermoplastic class material or another material using a casting technique, which may be iterative. As an example, an overmolding process may utilize one or more of ABS, HDPE, PEEK, NYLON, polycarbonate, polyetherimide, polybutylene terephthalate, PMMA, polyoxymethylene, polypropylene, silicone, thermoplastic elastomers, thermoplastic polyurethane, and thermoplastic rubber. As an example, a method can include overmolding a rigid or semi-rigid plastic with a less rigid material where the less rigid material forms at least two corner bumpers.

Figure 16:
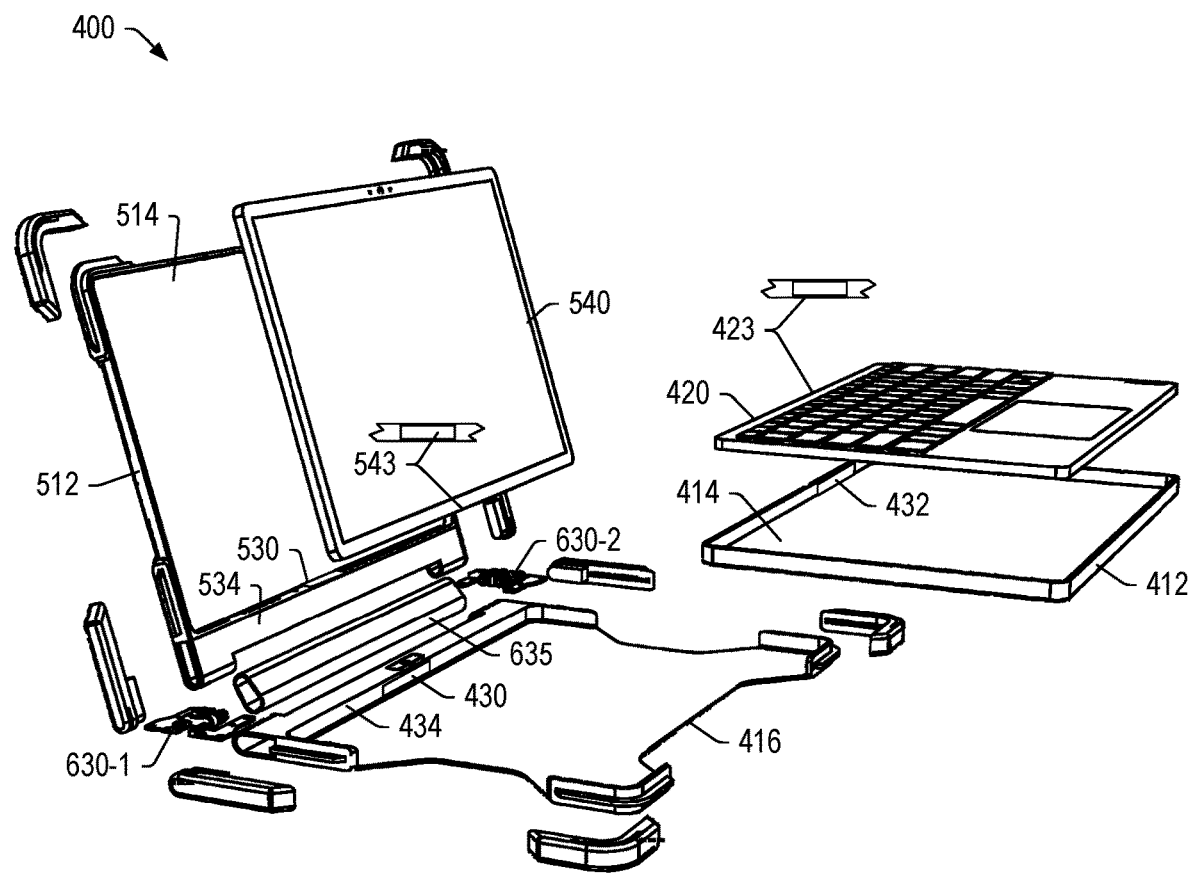
FIG. 16 is an exploded view of an example of a computing device.

FIG. 16 shows an exploded view of an example of the computing device 400. As shown, the hinge assembly 600 can include hinges 630-1 and 630-2, which may be dual axle hinges that include meshing gears that rotate in unison. The hinge assembly 600 can further include a hinge cover 635, which may be formed as a tube that can cover portions of the hinges 630-1 and 630-2. In the example of FIG. 16, the hinges 630-1 and 630-2 may be disposed at least in part in the components 434 and 534, for example, where leaves of the hinges 630-1 and 630-2 can be appropriately connected.

FIG. 16 also shows the connectors 430, 432 and 530 where the display assembly 540 can include a connector 543 and where the keyboard assembly 420 can include a connector 423. As explained, various connectors can mate such that electrical connections can be established between circuitry of assemblies.

As an example, a shell and/or a shell holder may include bumpers or may be bumper-less. As an example, a shell and/or a shell holder may include features for coupling of bumpers or may be without such features (e.g., without extensions and/or sockets for bumpers). As an example, a housing without bumpers may be shaped akin to one of the housings of FIG. 1, FIG. 2, or FIG. 3, where a housing includes a shell with a bay.

Figure 17:
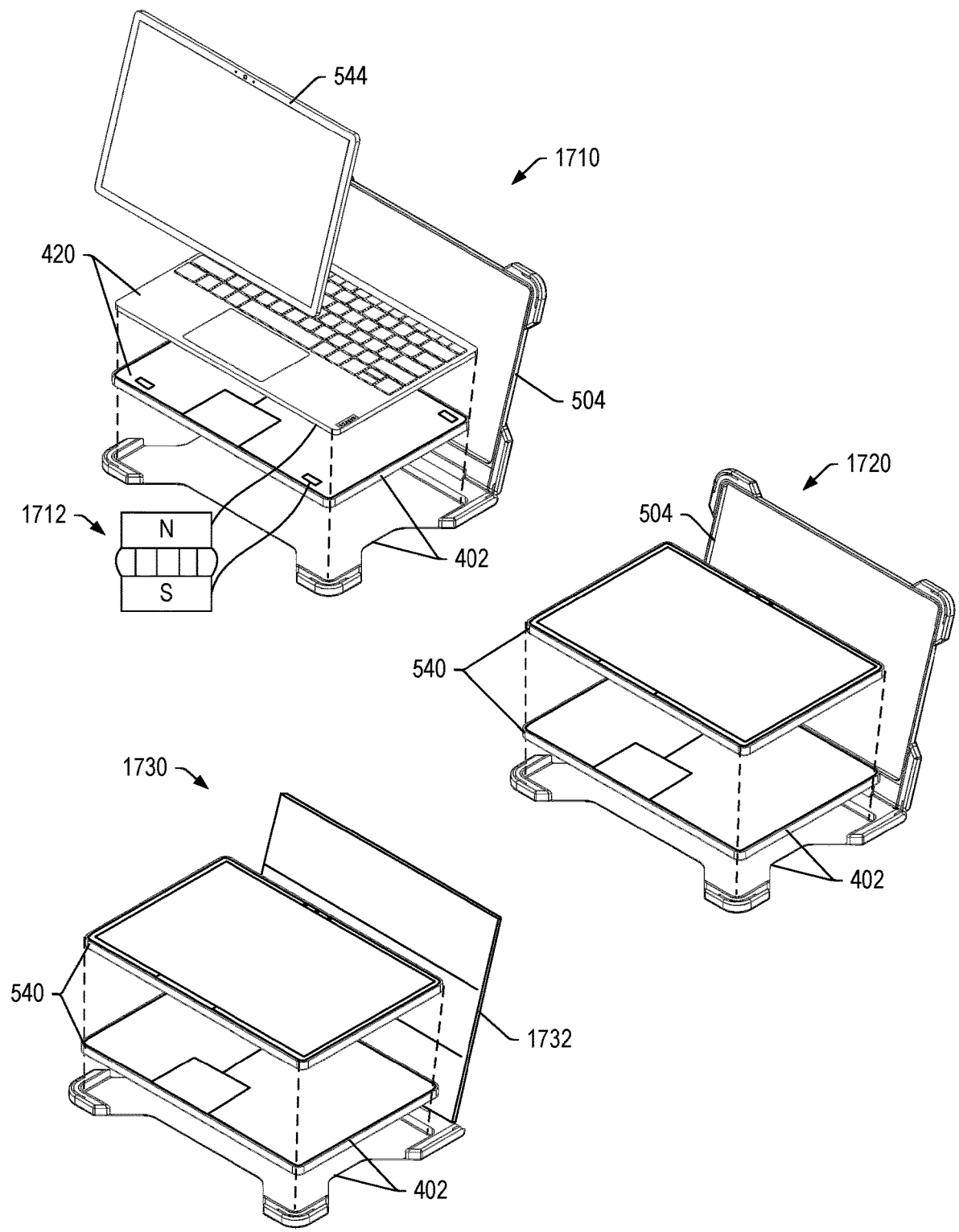
FIG. 17 is a series of diagrams of examples of computing devices.

FIG. 17 shows various example configurations 1710, 1720 and 1730 of the computing device 400. As shown, the configuration 1710 can be a notebook configuration with a keyboard and a display, the configuration 1720 can be a tablet with a bumper protected display cover configuration, and the configuration 1730 can be a tablet with a flap display cover 1732 configuration. As shown, the configuration 1710 can include a keyboard housing 420 with computing components and the configurations 1720 and 1730 can include a display housing with computing components. In various configurations, computing components may be separable from a keyboard and/or a display. For example, a keyboard may be a relatively flat component that can be placed over a computing assembly and a display may be a relatively flat component that can be placed over a computing assembly.

As an example, a computing device can include a chassis sub-assembly where a keyboard can be set onto or into the sub-assembly to form a keyboard assembly with computing components and/or where a display can be set onto or into the sub-assembly to form a display assembly with computing components, for example, to form a tablet computing device. In such an example, the computing components may be replaceable, swappable in a relatively easy manner such that an assembly can be customized.

As shown in the example of FIG. 17, ferromagnetic material 1712, which can include a number of permanent magnets, can be utilized to secure various sub-assemblies. For example, the keyboard housing 420 can be an assembly with sub-assemblies that are secured via a magnetic attraction force using the ferromagnetic material 1712. In such an approach, electrical contacts may be mated between the sub-assemblies. As an example, the sub-assemblies can include electrical contacts that include spring-biased contacts (e.g., pogo-pins), plug and socket contacts, etc. As an example, an interface between two sub-assemblies can be exposed where a user can insert a fingernail or fingernails to pry apart the sub-assemblies. As an example, one sub-assembly may be disposed in a shell that includes component bays where various components of the sub-assembly can be secured in the component bays using one or more mechanisms (see, e.g., FIG. 19 and FIG. 20).

As an example, a sub-assembly may be a shell cover. For example, the keyboard housing 420 can include a keyboard sub-assembly as a shell cover and the display housing 540 can include a display sub-assembly as a shell cover.

As an example, a computing device can include separate notebook and tablet cover cases (see, e.g., configurations of FIG. 17). As an example, a computing device can be configurable using one or more covers as a part of a platform to build a notebook and to build a tablet. In various examples, a user can swap out a keyboard for a second display, for example sketching on it with another application on top. Or, for example, a user can swap out a primary cover display for a paper holder turning the notebook into a tablet with a protective cover.

Figure 18:
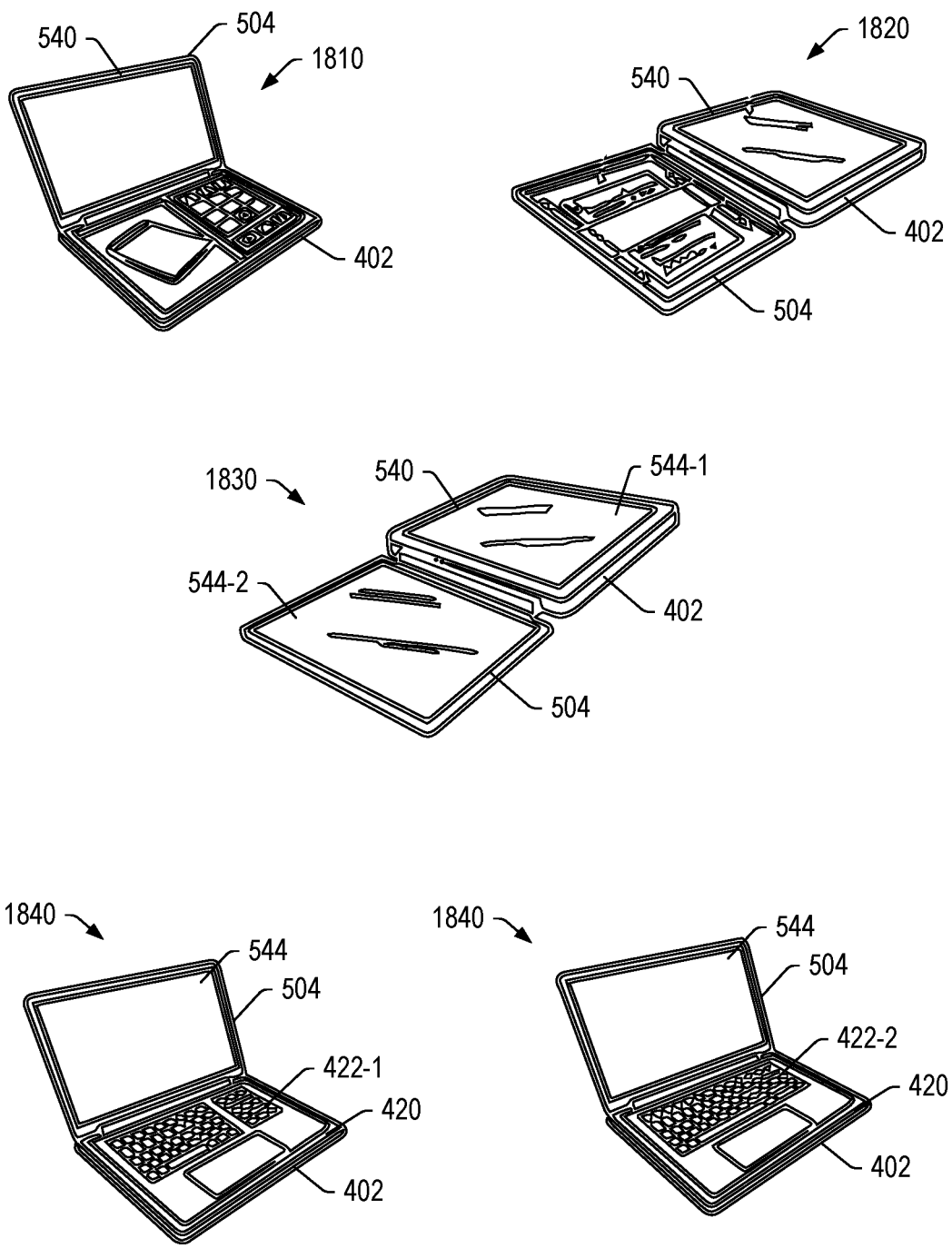
FIG. 18 is a series of diagrams of examples of computing devices.

FIG. 18 shows example configurations 1810, 1820, 1830 and 1840 for housings 402 and 504 with respect to a display assembly 540, displays 544, 544-1 and 544-2 and keyboard assembly 420 with respect to keyboards 422-1 and 422-2. As shown, the keyboard 422-1 can differ from the keyboard 422-2. For example, the keyboard 422-1 can include a number pad. As shown, the configurations 1810 and 1820 can provide for carrying various items within the housing 402 or within the housing 504, respectively. As to the configuration 1830, it includes two displays 544-1 and 544-2, noting that a touchpad, a digitizer, etc., may be utilized, for example, to replace one of the two displays 544-1 and 544-2.

As an example, a computing device can include a housing that includes a shell and a shell cover, where the shell cover may include a keyboard, a display or another feature; and an electronic component secured in a component bay of the shell by a latch accessible upon displacement of the shell cover, where the component bay includes an electrical bay contact and bay magnets, where the electronic component includes an electrical component contact and component magnets, and where the component magnets are coupled to the latch and move responsive to actuation of the latch to lock the electronic component in the component bay via a magnetic attraction force between the bay magnets and the component magnets that mates the electrical bay contact and the electrical component contact and to unlock the electronic component for removal from the component bay.

Figure 19:
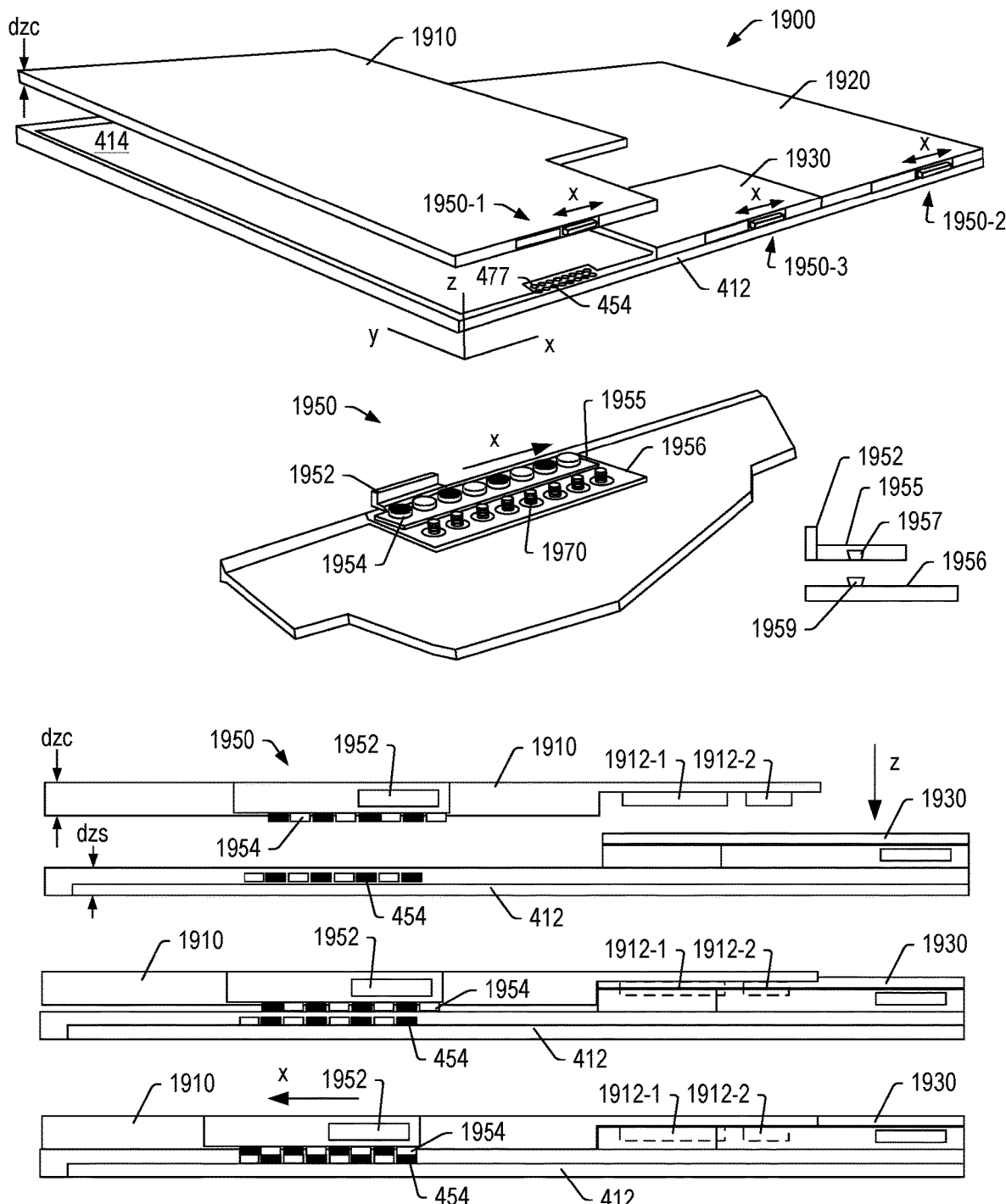
FIG. 19 is a series of diagrams of examples of magnetic mechanisms.

FIG. 19 shows an example of an assembly 1900 that includes various components 1910, 1920 and 1930 that can be assembled onto the shell 412, for example, in the bay 414, which can include electrical connectors 477 (e.g., electrical component contacts) along with a number of magnets 454 (e.g., bay magnets). In the example of FIG. 19, the various components 1910, 1920 and 1930 can be accessible upon removal of a shell cover, which, as mentioned, may be an assembly or part of an assembly such as, for example, a keyboard assembly, a display assembly, etc. In FIG. 19, a Cartesian coordinate system is shown that can be utilized to define one or more features. For example, the component 1910 can include a thickness of dzc and a footprint with respect to x and y dimensions for fitting into the bay 414 of the shell 412.

Figure 20:
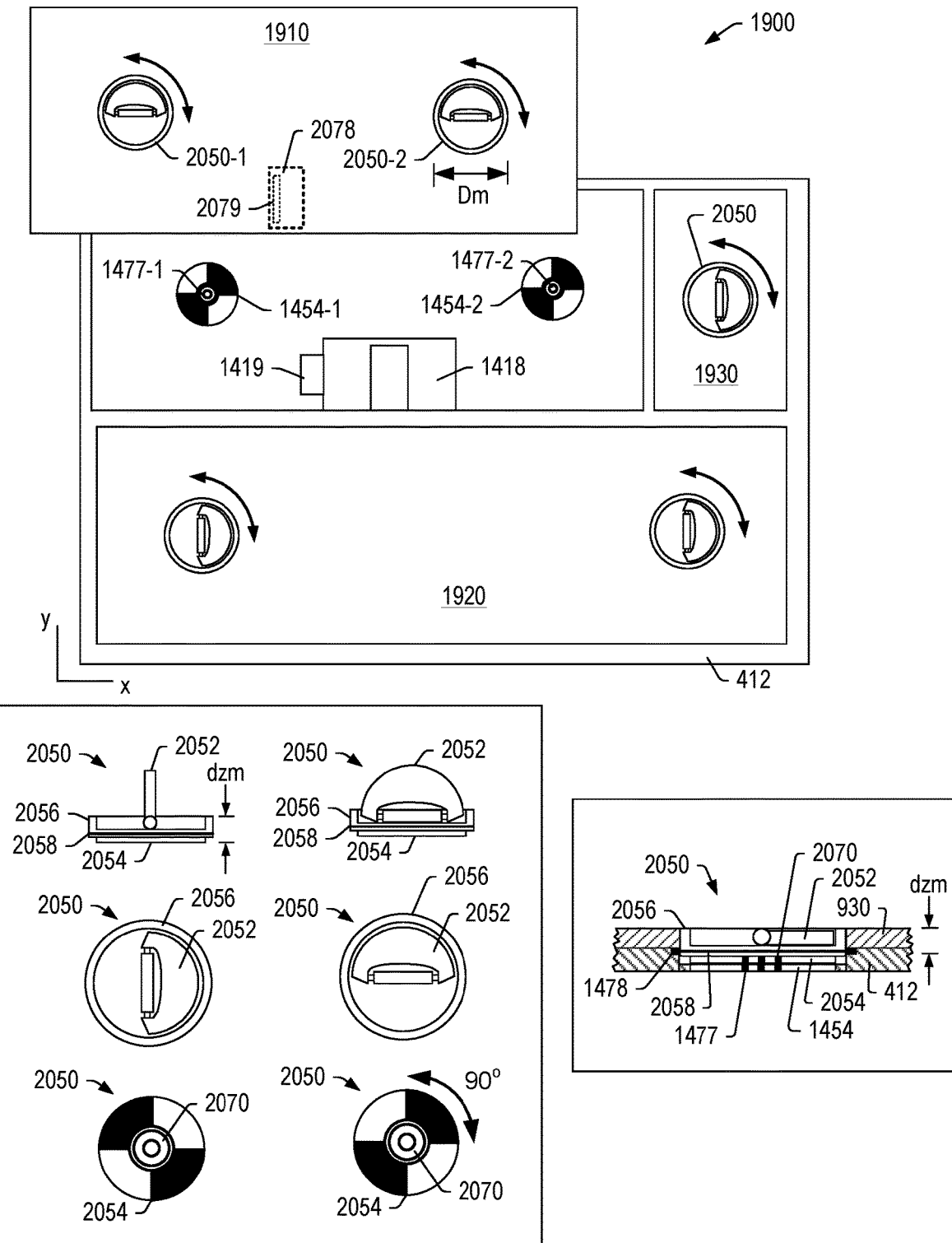
FIG. 20 is a series of diagrams of examples of magnetic mechanisms.

Referring again to FIG. 17, various assemblies are shown, which may include a cover unit that can be a shell cover, optionally with a display, a keyboard, etc., and which may include a shell with various components, which may be processing components, memory components, security components, battery components, etc. As an example, a shell cover can include electrical contacts and can include ferromagnetic material, which can include one or more permanent and/or electromagnets. While FIG. 19 and FIG. 20 show various mechanisms for various components, one or more of such mechanisms may be utilized for a shell cover that can cover such components.

As shown in the example of FIG. 19, each of the components 1910, 1920 and 1930 can include a mechanism

1950-1, 1950-2 and 1950-3 that provides for physical component securing and/or electrical circuitry contacting. In the example of FIG. 19, a mechanism can be a latch that can be moved, for example, by a user's hand, optionally in a tool-less manner. In the example of FIG. 19, the mechanisms 1950-1, 1950-2 and 1950-3 are shown as being translatable in an x direction, noting that a y direction approach may be utilized or a z direction approach. As an example, one or more magnets may be utilized that can provide for registration of features for proper alignment and, for example, appropriate force to maintain robust contact between electrical contacts (e.g., connectors, etc.). As an example, one or more magnets may be positioned adjacent to electrical contacts and/or remote from electrical contacts.

FIG. 19 shows an example of the mechanism 1950 that includes a translating component 1955 that may be translated via force applied to a tab 1952 (e.g., a grip, etc.). For example, consider a rail and groove arrangement that provides for movement of the translating component 1955. In such an example, the translating component 1955 may include a rail 1959 and/or a groove 1957 while a base 1956 can include a groove 1957 and/or a rail 1959. As shown, the groove 1957 and the rail 1959 can be shaped to provide for securing the rail 1959 in the groove 1957, for example, by sliding the translating component 1955 with respect to the base 1956 such that the rail 1959 enters the groove 1957. As shown, the translating component 1955 can include a number of magnets 1954, which may be of particular orientations, polarities, etc. (e.g., black magnets may be oriented with a particular pole upward (e.g., N) and white magnets may be oriented with an opposing pole upward (e.g., S). In the example of FIG. 19, the translating component 1955 can be proximate to (e.g., adjacent to, etc.) an electrical connector 1970, which may utilize electrically conductive contacts, which may be spring-loaded (e.g., consider pogo-pins, metal springs, etc.).

FIG. 19 shows, graphically, a method where the mechanism 1950 can be utilized to establish secure electrical contact for the component 1910. As shown, magnets 1954 can be translated to be appropriately aligned with the magnets 454 such that an appropriate magnetic attraction force is established that can secure the component 1910 with respect to the shell 412 for purposes of electrical connections, which may be via the connectors 1970 and the connectors 477 and/or one or more other connectors such as example connectors 1912-1 and 1912-2, which can have counterparts in the shell 412 and/or another component or components. In such an example, electrical connectors may be proximate to the magnets 1954 and 454 and/or may be a distance therefrom, which may be a distance that is sufficient to minimize influence of one or more magnetic fields on electrical signals. In the example of FIG. 19, magnets can help with alignment to assure that a component or components are properly positioned. As an example, magnets may be positioned such that a magnetic repulsion force is generated that can help with component removal. For example, consider a force that can cause the component 1910 to be moved in an upward direction along a z-axis away from the shell 412.

As an example, magnets can include various types of arrangements of poles, sizes, shapes, etc. As an example, magnets can be arranged to provide a damping mechanism. For example, consider a damping mechanism that includes magnets such as spring magnets where reducing a distance increases repulsion more than attraction and where increasing the distance increases attraction more than repulsion where, for example, at a sufficiently large distance, both attraction and repulsion may be minimal (e.g., effectively canceling, etc.). In such an approach, a desired distance may be maintained with appropriate attraction and repulsion forces.

As an example, a device can include one or more magnets such as, for example, one or more POLYMAGNET magnets (Correlated Magnetics Research, LLC, Huntsville, Alabama). As an example, a device may include an arrangement of magnets that aims to provide attraction between components without generating an excessively strong field that may extend well beyond the magnets. As an example, coding of small magnetics arranged in series, in parallel, in one or more arrays, etc. may be utilized for magnetically coupling components of a computing device, optionally without using a mechanical coupling.

A magnet such as a POLYMAGNET magnet can be formed from rare earth magnetic material with desired patterns of north and south poles on a single piece of magnetic material. In such an approach, fields coming off of these patterns of north and south poles in turn define the feel and function of a POLYMAGNET magnet with respect to another magnet or magnets, which may also be or include one or more POLYMAGNET magnets.

FIG. 20 shows an example of the assembly 1900 with examples of the components 1910, 1920 and 1930 where one or more rotational mechanisms, shown as the rotational mechanism 2050 for the component 1930 and as the rotational mechanisms 2050-1 and 2050-2 for the component 1910, can be utilized, additionally or alternatively to a translational mechanism (see, e.g., FIG. 19). As shown, the components 1910, 1920 and 1930 can be received by the shell 412 where the shell 412 can include circuitry 1418, magnets 1454, 1454-1 and 1454-2 and connectors 1477, 1477-1 and 1477-2 and/or 1419. In the example of FIG. 20, the circuitry 1418 can electrically connect with circuitry 2078 of the component 1910, which can include a connector 2079. As explained, one or more magnets may provide for registration that aligns one or more electrical connectors and that may, for example, provide for an appropriate magnetic force to maintain robust connection between connectors.

As shown in FIG. 20, the rotational mechanism 2050 can include a base 2056, with a foldable grip 2052 (e.g., a handle) where the base 2056 includes a number of magnets 2054 and optionally one or more connectors 2058 and/or 2070. As shown, the rotational mechanism 2050 may be rotatable a number of degrees such as, for example, 90 degrees. In such an approach, the number of magnets 2054 of the rotational mechanism 2050 can be appropriately aligned with the number magnets 1454 (e.g., or 1454-1 or 1454-2) of the shell 412 such that the component 1930 (e.g., or the component 1920 and/or the component 1930) can be secured in the shell 412.

As an example, the rotational mechanism 2050 can be circular and defined by a radius or a diameter (see, e.g., Dm as to the rotational mechanism 2050-2). As an example, a rotational mechanism may have a different shape (e.g., polygonal, elliptical, etc.). As an example, a rotational mechanism may be set in a recess where a base can be seated in the recess and can be rotatable in the recess. As an example, a thickness of the rotational mechanism 2050, dzm, may be substantially equal to the thickness of a component (see, e.g., dzc of FIG. 19) or it may be slightly greater such that a portion of the rotational mechanism 2050 can be seated in a recess of the shell 412 (see, e.g., cut-away view). As an example, the rotational mechanisms 2050-1 and 2050-2 can be of a thickness such that the tops of the rotational mechanisms 2050-1 and 2050-2 are substantially flush with the top surface of the component 1910. In the example of FIG. 20, the number of magnets 2054 may be substantially flush with a bottom surface of a component or, as mentioned, a portion of a rotational mechanism can extend outwardly from a bottom surface of a component to be received by a recess of a shell. As an example, a component may have a relatively flat top surface and a relatively flat bottom surface where translational and/or rotational mechanisms may be flush with one or more of the top and bottom surfaces. In FIG. 19 and FIG. 20, the example mechanisms 1950 and 2050 may be disposed substantially even with or otherwise between a top and a bottom surface of a component, noting that in the example of FIG. 20, the example rotational mechanism 2050 can include the foldable grip 2052 that can be positioned to extend outwardly from the example rotational mechanism 2050. One or more dimensions of a mechanism may depend on whether a mechanism is for securing or for securing and electrical connecting. For example, in various examples, where electrical connecting is desired, a portion of a mechanism may extend outwardly from a surface of a component such that electrical connectors can mate (e.g., consider a socket-plug or other male-female arrangement).

In the example of FIG. 20, the base 2056 may include one or more connectors, which may be appropriately shaped and positioned to allow for electrical connection (e.g., when rotated by a number of degrees). For example, a continuous and/or a discrete approach may be utilized, where, for example, electrical contacts are positioned along a perimeter of the base 2056 and/or on a bottom of the base 2056. In such an approach, a shell can include corresponding matching features to mate with such electrical contacts. As an example, a shell can include features that may extend outwardly such that they engage features of a component. For example, electrical contacts of a shell can include spring-biased or other type of electrical contacts that can extend outwardly to engage electrical contacts of a component (e.g., pogo-pins, etc.), which may or may not be part of a magnetic attachment mechanism. As an example, a magnetic attachment mechanism may provide for electrical connection between one or more types of electrical connectors, whether flat, recessed, outwardly extending, etc.

FIG. 20 shows a cut-away view of an example of the connector 2050 of the component 930 seated in a recess of the component 930 where the component 930 is seated in the shell 412. As shown, one or more electrical connections may be established along with securing of the component 930 in the shell 412 via a magnetic attraction force. In the example of the cut-away view of FIG. 20, the connector 2070 of the rotational mechanism 2050 can establish a connection with the connector 1477 of the shell 412 and/or the connector 2058 of the rotational mechanism 2050 can establish a connection with a connector 1478 of the shell 412 where the number of magnets 2054 establish a magnetic attraction force with the number of magnets 1454. As shown, the foldable grip 2052 can be folded such that the rotational mechanism 2050 may be seated in a flush or recessed manner in the recess of the component 930. Upon rotation of the rotational mechanism 2050, the magnets 2054 and 1454 may establish a magnetic repulsion force such that the component 930 is forced upwardly a distance that may facilitate removal of the component 930 from the shell 412 (e.g., consider the black portions of the number of magnets 2054 being one pole (e.g., N) and the white portions of the number of magnets 2054 being an opposite pole (e.g., S)). In such an example, the distance may be sufficient to disconnect one or more electrical connections between the component 930 and the shell 412 and/or another component (e.g., whether an electrical connection is directly via the rotational mechanism 2050 or via another electrical connector positioned elsewhere on the component 930). As an example, a mechanism can include one or more electrical connectors that are electrically connected to circuitry of a component. For example, the connectors 2058 and/or 2070, if present, can be electrically connected to circuitry of the component 930 (e.g., the base 2056 may include a connector such as the connector 2058 that is also electrically connected to the connector 2058 and/or the connector 2070).

In the examples of FIG. 19 and FIG. 20, the components 1910, 1920 and 1930 can include, for example, a system board (e.g., a motherboard), a memory board (e.g., SDD card, etc.), and a battery (e.g., a lithium-ion battery, etc.).

As shown in the examples of FIG. 17, a shell cover can be placed over components disposed in a bay of a shell (e.g., a component bay, etc.) where the shell cover may have a substantially flat (e.g., planar) lower surface. As explained, a component, a shell, an assembly, etc., can include one or more electrical connectors (e.g., electrical contacts, etc.) that can provide for electrical connections for circuitry. As shown in FIG. 17, a keyboard assembly 420 can include a keyboard portion as a cover for a shell that includes various components and a display assembly 540 can include a display portion as a cover for a shell that includes various components. In such examples, the components of the shells may be secured using features of the examples of FIG. 19 and/or FIG. 20.

In the examples of FIG. 19 and FIG. 20, various components may be swapped, replaced, serviced, etc., optionally without the use of screws. Such an approach can expedite repairs as various small screws are not present, which demand multiple rotations using tools. As explained, an approach as in FIG. 19 and FIG. 20 can be tool-less such that a screwdriver is not required to remove and/or install a component. In the examples of FIG. 19 and FIG. 20, utilization of ribbon cables may be minimized or alleviated as circuitry may be part of a shell and/or as various components may interconnect.

As explained, a number of magnets can be shaped, sized, arranged, etc., to provide for registration such that alignment of components is proper. As explained, connectors such as, for example, pogo-pins may be utilized and/or one or more other types of spring-biased electrical contact connectors.

As to POLYMAGNET types of magnets, these may be referred to as programmable magnets as the arrangements, shapes, sizes, etc., can be programmed as part of a manufacturing process.

As explained, a computing device can include various components and features that provide for ease of configuration. Such a computing device may include corner bumpers, which may provide for protection against mechanical shocks.

As an example, a computing device may be configurable for a user by an institution. For example, consider a school that includes a number of grade levels where such a computing device can be configured for younger children with basic features (e.g., a tablet form factor), older children with the addition of a keyboard and more advanced children as a laptop computing device with suitable computing power. In such an approach, the school may order a number of components as may be suitable for the number of children at each level where an IT department can readily configure the computing devices and adapt them as appropriate. Such an approach can provide an ecosystem where components can be swapped, devices configured, etc. As explained, through the addition of bumpers, a device may be easier to handle (e.g., less likely to be dropped) and/or damaged by mechanical shock.

FIG. 21 shows a block diagram of a system 2100 that can include one or more shells 2110, one or more shell holders 2120, one or more hinge assemblies 2130, bumpers 2140, a variety of assemblies 2150 (e.g., display, keyboard, processing, etc.), various components 2160 (e.g., as assembly components, etc.), and one or more positioning mechanism 2170 (e.g., magnetic, electrical, mechanical, etc.). As an example, a computing device can be configured using various features of the system 2100, for example, to provide a customized computing device that may be suited for a particular purpose, a particular group of users, etc. In such an example, the computing device may be reconfigured for another purpose, another group of users, etc.

Figure 22:
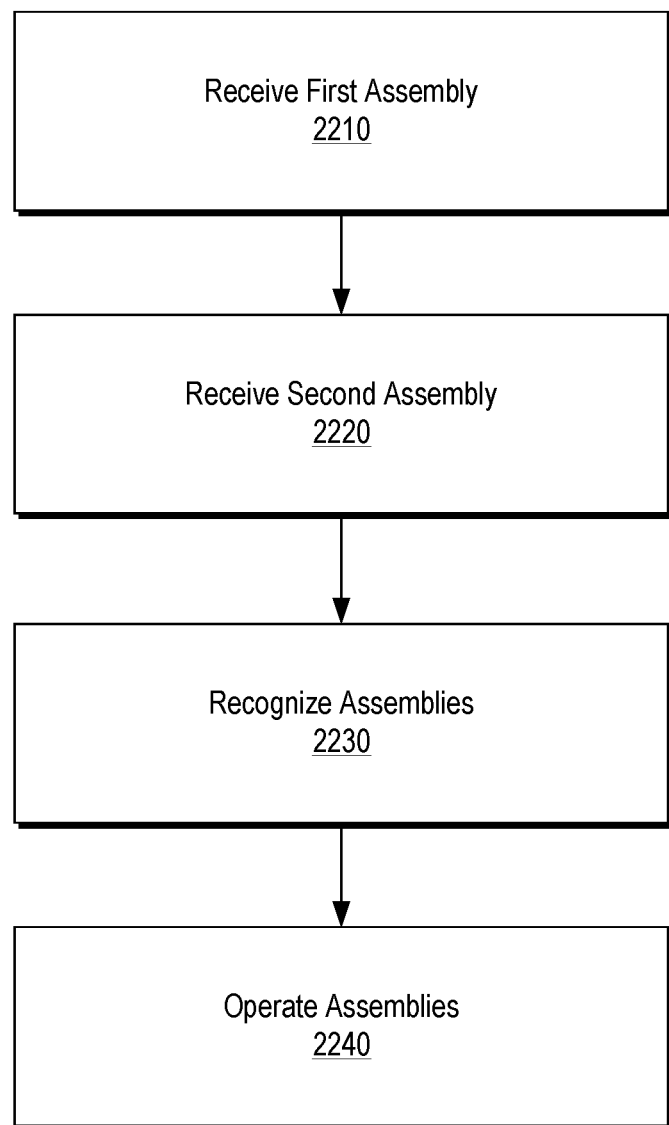
FIG. 22 is a diagram of an example of a method.

FIG. 22 shows an example of a method 2200 that includes a reception block 2210 for receiving a first assembly, a reception block 2220 for receiving a second assembly, a recognition block 2230 for recognizing the assemblies and an operation block for operating the assemblies. As explained, a computing device can be configurable using one or more assemblies. In such an approach, circuitry can allow for assembly recognition such that operation of the computing device is customized to the capabilities of the one or more assemblies. As an example, various components can be coded where an application can assess a code or codes and configure an operating system to provide for appropriate functionality for the various components.

As an example, a computing device can include a first shell that includes a first bay; a second shell that includes a second bay; a hinge assembly that couples the first shell and the second shell; and a display assembly positionable in the first bay and positionable in the second bay. In such an example, the computing device can include a keyboard assembly positionable in at least the one of the first bay and the second bay. As an example, a display assembly can be positioned in a first bay and a keyboard assembly can be positioned in a second bay. As an example, a display assembly can be a first display assembly positioned in a first bay and a second display assembly can be positioned in a second bay.

As an example, a computing device can include a processor assembly positionable in at least the one of a first bay and a second bay where, for example, a display assembly is positionable in the same bay as the processor assembly to cover the processor assembly or, for example, where a keyboard assembly is positionable in the same bay as the processor assembly to cover the processor assembly. As an example, a processor assembly can include a processor, memory accessible to the processor and a battery.

As an example, a computing device can include a first shell that includes a first bay, a second shell that includes a second bay, and a processor assembly that includes a port where at least one of the first shell and the second shell includes an opening for the port. For example, the first shell, the second shell or the first shell and the second shell can include a respective opening for a port or ports.

As an example, a computing device can include a hinge assembly that is a 360 degree hinge assembly. As an example, a hinge assembly can be a dual axis hinge assembly, which may include two axles and gears that mesh for synchronized rotation. As an example, two gears may directly mesh or they may mesh via an intermediate gear.

As an example, a computing device can include a first shell that includes a first electrical connector and a second shell that includes a second electrical connector that is electrically coupled to the first electrical connector. In such an example, the first electrical connector and the second electrical connector have a common shape and size. As an example, one or more magnets may be included that provide for registration that aligns connectors and/or a magnetic attraction force that helps to establish and/or maintain an electrical connection between connectors.

As an example, a computing device can include a first shell that includes a first set of bumpers and a second shell that includes a second set of bumpers.

As an example, a computing device can include a first shell with a first bay that has a first depth and a second shell with a second bay that has a second depth that exceeds the first depth. In such an example, the second depth can accommodate a sum of a display assembly depth and a processor assembly depth and can accommodate a sum of a keyboard assembly depth and the processor assembly depth where, for example, the first depth can accommodates the display assembly depth. In such an example, the first depth may accommodate the keyboard assembly depth.

As an example, a computing device can include a first shell with a first bay that accommodates a stack of assemblies and can include a second shell with a second bay that accommodates a single assembly or, for example, a second shell with a second bay that accommodates a stack of assemblies.

As an example, a display assembly can be a tablet computing assembly that includes a processor and memory accessible to the processor.

As an example, a computing device can include a touch-sensitive assembly positionable in at least one of a first bay of a first shell and a second bay of a second shell.

As an example, a method can include receiving a first assembly in a first bay of a first shell coupled to a second shell via a hinge assembly; receiving a second assembly in a second bay of the second shell; performing an electronic handshake between the first assembly and the second assembly to recognize the first assembly and the second assembly; and, based on the electronic handshake, establishing electronic communication between the first assembly and the second assembly.

As explained, a system may include a number of assemblies and assembly components, which may be of same and/or different capabilities. In such an example, a computing device can include shells with bays that can accommodate one or more assemblies. In such an example, a user, a manufacturer, a service provider, etc., may select an assembly, customize an assembly, etc., of a computing device where the computing device can operate according to its equipment, optionally in an automatic manner that includes recognition of an assembly, assemblies, etc.

As explained, a computing device may include two shells, each with its own assembly, along with a switch or switches that can be actuated to power one or more of the assemblies. As an example, a computing device may include a common switch for two assemblies and/or individual switches for two assemblies. As an example, a computing device may include two assemblies that are operable in a coordinated manner and/or a computing device may include two assemblies that are operable independently. As an example, one or more switches may provide for coordinated and/or independent operation of multiple assemblies. Where a computing device includes two display assemblies, consider a scenario where the two display assemblies operate independently, for example, effectively as two separate devices; noting that they may operate using a common source of power, which may be a battery of one of the two display assemblies. As an example, where each assembly includes its own power source, coordinated and/or independent operation may utilize one or more of the power sources, optionally in a prioritized manner (e.g., prioritizing battery life of one of the assemblies by using the battery of the other one of the assemblies). For example, consider a keyboard assembly with a battery and a display assembly with a battery where the battery of the keyboard assembly may be utilized prior to tapping into the battery of the display assembly; noting that the display assembly may be a tablet computing device that can be operated independent from the keyboard assembly.

As an example, a computing device can include a processor; memory accessible to the processor; a display housing that includes a display operatively coupled to the processor, display housing bumper supports and peripheral display housing bumpers mounted to the display housing bumper supports; a base housing that includes base housing bumper supports and peripheral base housing bumpers mounted to the base housing bumper supports; and a hinge assembly that couples the display housing and the base housing. In such an example, the peripheral display housing bumpers can include four corner bumpers disposed on a band where, for example, each of at least two of the four corner bumpers includes a through slot that spans a vertex of a respective corner of a display housing. In such an example, a through slot can have closed ends.

As an example, peripheral base housing bumpers can include four corner bumpers disposed on a band.

As an example, peripheral display housing bumpers can include four discrete corner bumpers where, for example, each of two back end corner bumpers of the four discrete corner bumpers can include a through slot that does not span a vertex of a respective back end corner of a display housing. For example, consider a through slot that includes a closed end and an open end. As an example, each of two front end corner bumpers of four discrete corner bumpers of peripheral display housing bumpers can include a through slot that spans a vertex of a respective front end corner of a display housing.

As an example, a computing device can include peripheral base housing bumpers that include includes four discrete corner bumpers.

As an example, a computing device can include display housing bumper supports that are formed of a first material that has a first hardness where peripheral display housing bumpers are formed of a second material that has a second hardness, where the second hardness is less than the first hardness. In such an example, the first hardness can be greater than Shore D 50 and/or the second hardness can be less than Shore D 50.

As an example, for a closed position of a display housing and a base housing of a computing device, peripheral display housing bumpers can contact peripheral base housing bumpers.

As an example, at least two of peripheral display housing bumpers and at least two of peripheral base housing bumpers can have a common shape.

As an example, display housing bumper supports can form a groove that seats peripheral display housing bumpers.

As an example, display housing bumper supports can include four discrete bumper supports where, for example, peripheral display housing bumpers can include four discrete bumpers seated by the four discrete bumper supports.

As an example, peripheral display housing bumpers can include a first height and peripheral base housing bumpers can include a second height that is greater than the first height.

As an example, a base housing can include a port, where peripheral base housing bumpers do not cover the port. As an example, a base housing can include a port, where peripheral base housing bumpers include an opening aligned with the port.

As an example, a computing device can include a processor; memory accessible to the processor; a display housing that includes a display operatively coupled to the processor, display housing corner mounts and display housing corner bumpers attached to the display housing corner mounts; a base housing that includes base housing corner mounts and base housing corner bumpers attached to the base housing corner mounts; and a hinge assembly that couples the display housing and the base housing.

As an example, display housing corner mounts can include back end corner mounts and front end corner mounts where, for example, display housing corner bumpers include back end corner bumpers and front end corner bumpers. In such an example, each of the back end corner mounts can include an extension and a socket and each of the back end corner bumpers can include a recess and a plug where the recess can receive the extension and where the socket can receive the plug.

As an example, a component of a housing can include a recess that includes a hinge assembly recess. In such an example, the recess may also form a socket for a plug of a bumper. As an example, a hinge assembly can include a hinge assembly cover, where a hinge assembly is disposed in part in a hinge assembly recess and in part in the hinge assembly cover.

As an example, a computing device can include bumpers where the bumpers include at least two back end corner bumpers where each of the back end corner bumpers may include a back end slot where, for example, the back end slot includes an open end and a closed end.

As an example, a computing device can include bumper mounts where the bumper mounts include two front end corner mounts where, for example, each of the front end corner mounts includes an extension and where each of two front end corner bumpers includes a recess that can receive the extension. As an example, a front end corner bumper can include one or more slots that span a side edge and a top edge of a housing.

As an example, a computing device can include base housing corner mounts that include back end corner mounts and front end corner mounts where base housing corner bumpers include back end corner bumpers and front end corner bumpers. In such an example, in a closed position of a display housing with respect to a base housing of the computing device, surfaces of the display housing corner bumpers can mate with surfaces of the base housing corner bumpers. In such an example, the surfaces can include mating back end surfaces of equal surface area and mating front end surfaces of equal surface area. As an example, a computing device can include housings with bumpers where one front end corner bumper of a display housing has a leg that is longer than a front end corner bumper of a base housing such that a portion of the leg can be utilized as a finger contact area for opening the display housing.

As an example, a computing device can include a housing that includes a shell and a shell cover, where the shell cover includes a keyboard; and an electronic component secured in a component bay of the shell by a latch accessible upon displacement of the shell cover, where the component bay includes an electrical bay contact and bay magnets, where the electronic component includes an electrical component contact and component magnets, and where the component magnets are coupled to the latch and move responsive to actuation of the latch to lock the electronic component in the component bay via a magnetic attraction force between the bay magnets and the component magnets that mates the electrical bay contact and the electrical component contact and to unlock the electronic component for removal from the component bay. In such an example, to unlock the electronic component, the latch can move the component magnets to generate a magnetic repulsion force between the bay magnets and the component magnets.

As an example, an electronic component can include a processor, can include memory and/or can include a lithium-ion battery.

As an example, a shell can include a plurality of component bays. For example, consider component bays that include a motherboard component bay and a lithium-ion battery component bay.

As an example, a housing can include an electrical interconnect between an electrical bay contact of a component bay and another electrical bay contact of another component bay. For example, in the example of FIG. 20, each of the bays of the shell 412 can include one or more electrical bay contacts that can be interconnected via one or more electrical interconnects (e.g., wires, printed circuits, etc.).

As an example, a shell can include a printed circuit board that is electrically coupled to one or more electrical bay contacts. For example, in the example of FIG. 20, the shell 412 can include a printed circuit board that extends between various bays for the components 1910, 1920 and 1930. In such an example, the printed circuit board can provide for interconnection between two or more of the components and, for example, connection to one or more other components, assemblies, etc., which may be disposed in another, different shell (see, e.g., the examples of FIG. 17).

As an example, a latch can be a translatable latch, which may, for example, include an exposed tab (e.g., a prong, etc.). In such an example, the tab can be exposed for purposes of movement using a finger or fingers, for example, in a tool-less manner.

As an example, a latch can be a rotatable latch, which may, for example, include a foldable handle. In such an example, the foldable handle can be deployed for purposes of movement using a finger or fingers, for example, in a tool-less manner.

As an example, an electronic component can include one or more latches. For example, FIG. 20 shows a component with a single latch and components with two latches.

As an example, a computing device can include a shell with bay component magnets that are embedded in the shell.

As an example, a shell cover can be magnetically attachable to a shell. For example, a shell cover and a shell can include ferromagnetic material that can provide for a magnetic attraction force. In such an example, the force may be at a level that it can be broken by hand, for example, where a user can grip an edge of a shell cover and lift the shell cover. For example, in the examples of FIG. 17, a shell cover and assembly physical interface may be exposed such that a fingernail or fingernails can be inserted to then pry the shell cover from the assembly to lift the shell cover to expose the assembly, which may include, for example, a number of components disposed in component bays of a shell.

As an example, a computing device can include a display housing electrically coupled to circuitry of another housing.

As an example, a computing device can include component magnets and bay magnets include multiple magnetic poles such as, for example, POLYMAGNET magnets. In such an example, the magnets may control spacing between component magnets and bay magnets. For example, consider spring magnetics that include a number or repelling poles and a number of attracting poles to provide for a desired spacing between magnets. As an example, each of a number of component magnets and each of a number of bay magnets can include multiple north and south poles. In such an example, the multiple north and south poles can control spacing between the component magnets and the bay magnets.

As an example, a computer program product can include instructions to instruct a computing device, a computing system, etc., to perform one or more methods.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 23:
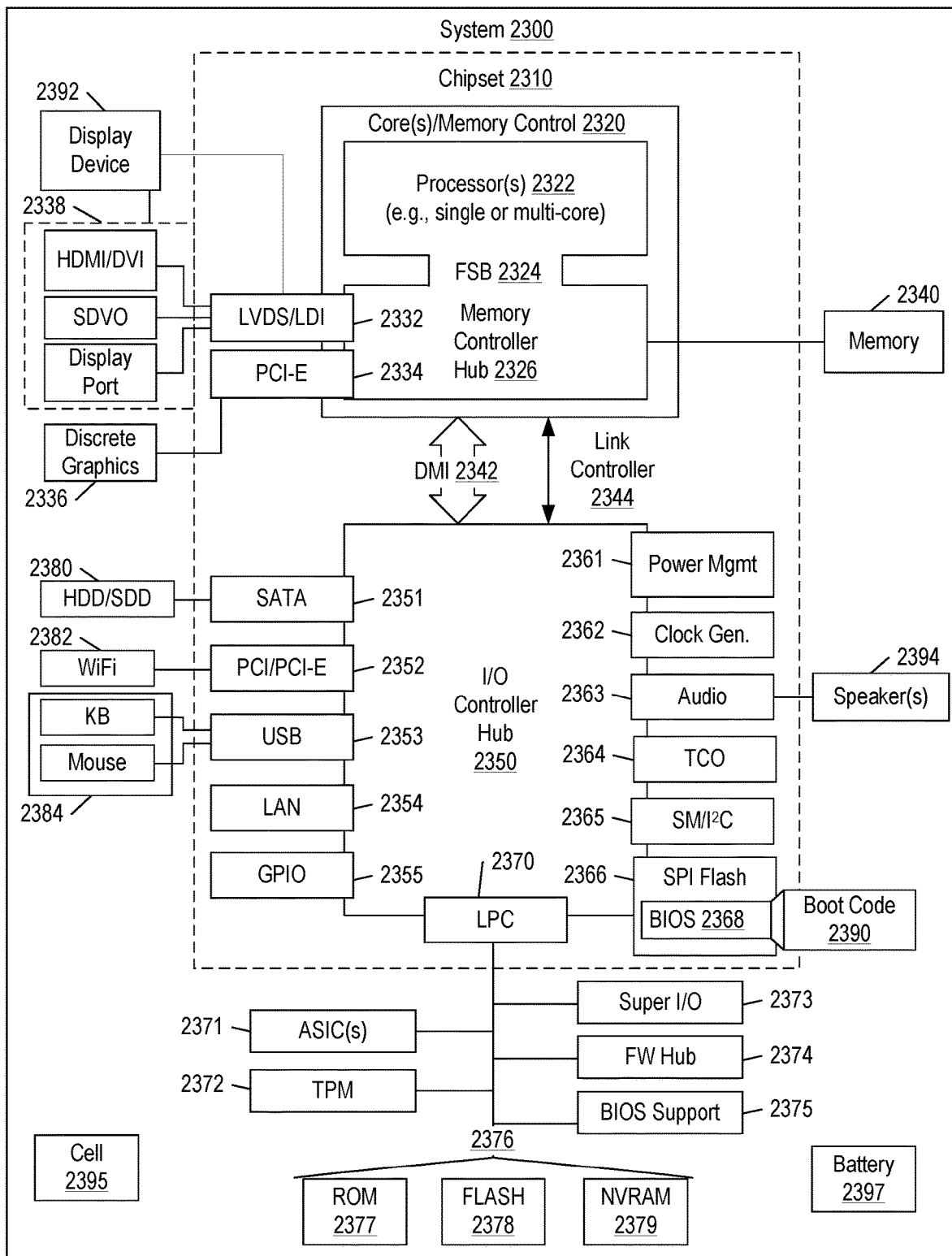
FIG. 23 is a diagram of an example of a system that includes one or more processors.

While various examples of circuits or circuitry have been discussed, FIG. 23 depicts a block diagram of an illustrative computer system 2300. The system 2300 may be a computer system, such as one of the ThinkCentre® or ThinkPad® series of personal computers sold by Lenovo (US) Inc. of Morrisville, NC, or a workstation computer system, such as the ThinkStation®, which are sold by Lenovo (US) Inc. of Morrisville, NC; however, as apparent from the description herein, a system or other machine may include other features or only some of the features of the system 2300.

As shown in FIG. 23, the system 2300 includes a so-called chipset 2310. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 23, the chipset 2310 has a particular architecture, which may vary to some extent depending on brand or manufacturer. The architecture of the chipset 2310 includes a core and memory control group 2320 and an I/O controller hub 2350 that exchange information (e.g., data, signals, commands, etc.) via, for example, a direct management interface or direct media interface (DMI) 2342 or a link controller 2344. In the example of FIG. 23, the DMI 2342 is a chip-to-chip interface (sometimes referred to as being a link between a "northbridge" and a "southbridge").

The core and memory control group 2320 include one or more processors 2322 (e.g., single core or multi-core) and a memory controller hub 2326 that exchange information via a front side bus (FSB) 2324. As described herein, various components of the core and memory control group 2320 may be integrated onto a single processor die, for example, to make a chip that supplants the conventional "northbridge" style architecture.

The memory controller hub 2326 interfaces with memory 2340. For example, the memory controller hub 2326 may provide support for DDR SDRAM memory (e.g., DDR, DDR2, DDR3, etc.). In general, the memory 2340 is a type of random-access memory (RAM). It is often referred to as "system memory".

The memory controller hub 2326 further includes a low-voltage differential signaling interface (LVDS) 2332. The LVDS 2332 may be a so-called LVDS Display Interface (LDI) for support of a display device 2392 (e.g., a CRT, a flat panel, a projector, etc.). A block 2338 includes some examples of technologies that may be supported via the LVDS interface 2332 (e.g., serial digital video, HDMI/DVI, display port). The memory controller hub 2326 also includes one or more PCI-express interfaces (PCI-E) 2334, for example, for support of discrete graphics 2336. Discrete graphics using a PCI-E interface has become an alternative approach to an accelerated graphics port (AGP). For example, the memory controller hub 2326 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 2350 includes a variety of interfaces. The example of FIG. 23 includes a SATA interface 2351, one or more PCI-E interfaces 2352 (optionally one or more legacy PCI interfaces), one or more USB interfaces 2353, a LAN interface 2354 (more generally a network interface), a general purpose I/O interface (GPIO) 2355, a low-pin count (LPC) interface 2370, a power management interface 2361, a clock generator interface 2362, an audio interface 2363 (e.g., for speakers 2394), a total cost of operation (TCO) interface 2364, a system management bus interface (e.g., a multi-master serial computer bus interface) 2365, and a serial peripheral flash memory/controller interface (SPI Flash) 2366, which, in the example of FIG. 23, includes BIOS 2368 and boot code 2390. With respect to network connections, the I/O hub controller 2350 may include integrated gigabit Ethernet controller lines multiplexed with a PCI-E interface port. Other network features may operate independent of a PCI-E interface.

The interfaces of the I/O hub controller 2350 provide for communication with various devices, networks, etc. For example, the SATA interface 2351 provides for reading, writing or reading and writing information on one or more drives 2380 such as HDDs, SDDs or a combination thereof. The I/O hub controller 2350 may also include an advanced host controller interface (AHCI) to support one or more drives 2380. The PCI-E interface 2352 allows for wireless connections 2382 to devices, networks, etc. The USB interface 2353 provides for input devices 2384 such as keyboards (KB), one or more optical sensors, mice and various other devices (e.g., microphones, cameras, phones, storage, media players, etc.). On or more other types of sensors may optionally rely on the USB interface 2353 or another interface (e.g., I²C, etc.). As to microphones, the system 2300 of FIG. 23 may include hardware (e.g., audio card) appropriately configured for receipt of sound (e.g., user voice, ambient sound, etc.).

In the example of FIG. 23, the LPC interface 2370 provides for use of one or more ASICs 2371, a trusted platform module (TPM) 2372, a super I/O 2373, a firmware hub 2374, BIOS support 2375 as well as various types of memory 2376 such as ROM 2377, Flash 2378, and non-volatile RAM (NVRAM) 2379. With respect to the TPM 2372, this module may be in the form of a chip that can be used to authenticate software and hardware devices. For example, a TPM may be capable of performing platform authentication and may be used to verify that a system seeking access is the expected system.

The system 2300, upon power on, may be configured to execute boot code 2390 for the BIOS 2368, as stored within the SPI Flash 2366, and thereafter processes data under the control of one or more operating systems and application software (e.g., stored in system memory 2340). An operating system may be stored in any of a variety of locations and accessed, for example, according to instructions of the BIOS 2368. Again, as described herein, a satellite, a base, a server or other machine may include fewer or more features than shown in the system 2300 of FIG. 23. Further, the system 2300 of FIG. 23 is shown as optionally include cell phone circuitry 2395, which may include GSM, CDMA, etc., types of circuitry configured for coordinated operation with one or more of the other features of the system 2300. Also shown in FIG. 23 is battery circuitry 2397, which may provide one or more battery, power, etc., associated features (e.g., optionally to instruct one or more other components of the system 2300). As an example, a SMBus may be operable via a LPC (see, e.g., the LPC interface 2370), via an I²C interface (see, e.g., the SM/I²C interface 2365), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A computing device comprising:
a case that comprises a hinge assembly, a display housing that comprises a display device bay that removably receives a display device that comprises a display, and a housing that comprises a shell and a shell cover, wherein the shell cover comprises a keyboard, wherein the shell cover comprises a tool-less, hand displaceable shell cover, and wherein the hinge assembly couples the display housing and the housing; and
an electronic component secured in a component bay of the shell by a latch accessible upon displacement of the shell cover, and wherein the latch comprises a tool-less, hand operable latch,
wherein the component bay comprises an electrical bay contact and bay magnets,
wherein the electronic component comprises an electrical component contact and component magnets, and
wherein the component magnets are coupled to the latch and move responsive to actuation of the latch to lock the electronic component in the component bay via a magnetic attraction force between the bay magnets and the component magnets that mates the electrical bay contact and the electrical component contact and to unlock the electronic component for removal from the component bay.

2. The computing device of claim 1, wherein, to unlock the electronic component, the latch moves the component magnets to generate a magnetic repulsion force between the bay magnets and the component magnets.

3. The computing device of claim 1, wherein the electronic component comprises a processor.

4. The computing device of claim 1, wherein the electronic component comprises memory.

5. The computing device of claim 1, wherein the electronic component comprises a lithium-ion battery.

6. The computing device of claim 1, wherein the shell comprises a plurality of component bays.

7. The computing device of claim 6, wherein the plurality of component bays comprises a motherboard component bay and a lithium-ion battery component bay.

8. The computing device of claim 1, wherein the housing comprises an electrical interconnect between the electrical bay contact of the component bay and another electrical bay contact of another component bay.

9. The computing device of claim 1, wherein the shell comprises a printed circuit board that is electrically coupled to the electrical bay contact.

10. The computing device of claim 1, wherein the latch comprises a translatable latch.

11. The computing device of claim 10, wherein the translatable latch comprises an exposed tab.

12. The computing device of claim 1, wherein the latch comprises a rotatable latch.

13. The computing device of claim 1, wherein the latch comprises a foldable handle.

14. The computing device of claim 1, wherein the electronic component comprises the latch.

15. The computing device of claim 1, wherein the bay component magnets are embedded in the shell.

16. The computing device of claim 1, wherein the shell cover is magnetically attachable to the shell.

17. The computing device of claim 1, wherein the display housing is electrically coupled to circuitry of the housing.

18. The computing device of claim 1, wherein each of the component magnets and each of the bay magnets comprise multiple north and south poles.

19. The computing device of claim 18, wherein the multiple north and south poles control spacing between the component magnets and the bay magnets.

20. The computing device of claim 1, wherein the display device comprises a tablet computing device and wherein the display housing comprises a display device shell that forms at least a portion of the display device bay and that is separable from the case to operate as a tablet computing device case.

* * * * *